US009785870B2

(12) United States Patent
Teruya et al.

(10) Patent No.: US 9,785,870 B2
(45) Date of Patent: Oct. 10, 2017

(54) PRINT CONTROL METHOD TO DISPLAY PRINT SETTINGS, RECORDING MEDIUM, AND PRINT CONTROL APPARATUS

(71) Applicants: Akira Teruya, Kanagawa (JP);
Naoyuki Urata, Kanagawa (JP);
Kanna Iinuma, Kanagawa (JP);
Teruyoshi Yamamoto, Tokyo (JP);
Miki Hashimoto, Kanagawa (JP)

(72) Inventors: Akira Teruya, Kanagawa (JP);
Naoyuki Urata, Kanagawa (JP);
Kanna Iinuma, Kanagawa (JP);
Teruyoshi Yamamoto, Tokyo (JP);
Miki Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 14/610,137

(22) Filed: Jan. 30, 2015

(65) Prior Publication Data
US 2015/0220289 A1   Aug. 6, 2015

(30) Foreign Application Priority Data

Feb. 5, 2014 (JP) .................. 2014-020154
Dec. 18, 2014 (JP) .................. 2014-256075

(51) Int. Cl.
*G06F 3/12* (2006.01)
*G06K 15/02* (2006.01)
*G06K 15/00* (2006.01)

(52) U.S. Cl.
CPC ....... *G06K 15/1801* (2013.01); *G06F 3/1204* (2013.01); *G06F 3/1205* (2013.01);
(Continued)

(58) Field of Classification Search
CPC .... G06F 3/1205; G06F 3/1253–3/1256; G06F 3/1258; G06F 3/1276; G06K 15/005; G06K 15/1801
(Continued)

(56) References Cited

U.S. PATENT DOCUMENTS 6,204,933 B1    3/2001 Yoshino et al.
6,621,590 B1 *  9/2003 Livingston ............ G06F 3/1256
                                                358/1.15
(Continued)

FOREIGN PATENT DOCUMENTS

JP        2013-012033        1/2013

*Primary Examiner* — Benny Q Tieu
*Assistant Examiner* — Juan M Guillermety
(74) *Attorney, Agent, or Firm* — Harness, Dickey & Pierce P.L.C.

(57) ABSTRACT

A print control method in an information processing apparatus includes a registration step of accepting via a setting screen a registration of a print setting for one or more specific pages of a print target including one or more pages, a storage step of storing in a storage device the print setting accepted by the registration step with corresponding identification information identifying the specific pages, a first displaying step of displaying on the setting screen the identification information of the specific pages stored by the storage step, a selection step of accepting via the setting screen a selection of identification information displayed in the first displaying step, and a second displaying step of displaying on the setting screen the print setting corresponding to the identification information whose selection is accepted in the selection step.

20 Claims, 27 Drawing Sheets

(52) U.S. Cl.
CPC .......... *G06F 3/1256* (2013.01); *G06F 3/1257* (2013.01); *G06K 15/005* (2013.01); *G06F 2206/1514* (2013.01)

(58) Field of Classification Search
USPC ........................................................ 358/1.13
See application file for complete search history.

(56) References Cited

U.S. PATENT DOCUMENTS

| | | |
|---|---|---|
| 7,130,076 B2 | 10/2006 | Shibuya et al. |
| 7,301,669 B1 | 11/2007 | Yamada et al. |
| 7,679,781 B2 | 3/2010 | Shibuya et al. |
| 7,734,103 B2 | 6/2010 | Sato et al. |
| 7,864,372 B2 | 1/2011 | Shibuya et al. |
| 7,948,659 B2 | 5/2011 | Shibuya et al. |
| 8,451,490 B2 * | 5/2013 | Sugiyama .......... H04N 1/32101 358/1.13 |
| 8,768,232 B2 | 7/2014 | Yamamoto et al. |
| 8,842,338 B2 | 9/2014 | Hayakawa et al. |
| 2005/0168764 A1 * | 8/2005 | Yamamura ......... H04N 1/00432 358/1.13 |
| 2006/0215200 A1 | 9/2006 | Mutsuro et al. |
| 2008/0144088 A1 * | 6/2008 | Furuya .................. G06F 3/1256 358/1.15 |
| 2008/0266597 A1 * | 10/2008 | Ushio .................. G06K 15/005 358/1.13 |
| 2009/0219555 A1 * | 9/2009 | Tanaka .................. G06F 3/1257 358/1.9 |
| 2010/0027043 A1 * | 2/2010 | Kato ..................... G06F 3/1257 358/1.13 |
| 2010/0306646 A1 * | 12/2010 | Fukase .................. G06F 3/1256 715/274 |
| 2012/0194861 A1 * | 8/2012 | Miyaguchi ............ G06F 3/1253 358/1.15 |
| 2012/0224204 A1 | 9/2012 | Yamagishi |
| 2013/0003098 A1 * | 1/2013 | Hayakawa ............ G06F 3/1257 358/1.13 |
| 2014/0092426 A1 * | 4/2014 | Fujishita ............... G06K 15/005 358/1.15 |
| 2014/0270879 A1 | 9/2014 | Yamamoto et al. |
| 2014/0368852 A1 | 12/2014 | Teruya et al. |

* cited by examiner

| PAGE NUMBER (IDENTIFICATION KEY) | INPUT TRAY | PAPER SIZE | ... | ROTATE |
|---|---|---|---|---|
| 1 | TRAY 1 | A4 | ... | SAME AS JOB SETTINGS |
| 2 | TRAY 2 | B5 | ... | SAME AS JOB SETTINGS |
| 3 | TRAY 3 | A4 | ... | SAME AS JOB SETTINGS |
| ... | | | | |

| PAGE NUMBER (IDENTIFICATION KEY) | INPUT TRAY | PAPER SIZE | ... | ROTATE |
|---|---|---|---|---|
| 1 | TRAY 1 | A4 | ... | SAME AS JOB SETTINGS |
| 2 | TRAY 2 | B5 | ... | SAME AS JOB SETTINGS |
| 4 | TRAY 3 | A4 | ... | SAME AS JOB SETTINGS |
| ... | | | | |

| PAGE NUMBER (IDENTIFICATION KEY) | INPUT TRAY | PAPER SIZE | ... | ROTATE |
|---|---|---|---|---|
| 1 | TRAY 1 | A4 | ... | SAME AS JOB SETTINGS |
| 2 | TRAY 2 | B5 | ... | SAME AS JOB SETTINGS |
| --- | --- | --- | ... | --- |
| ... | | | ... | |

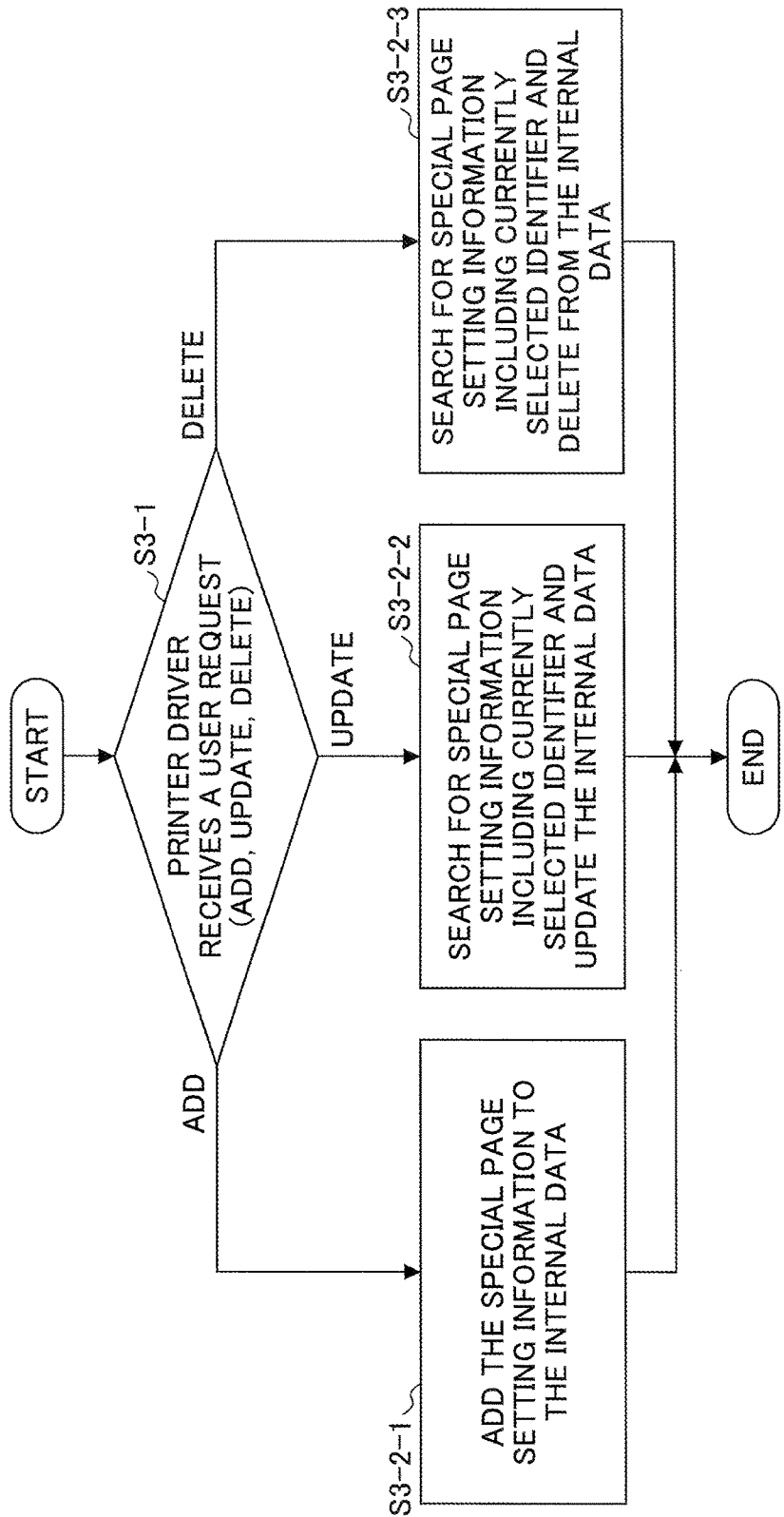

FIG.20A

■INSERT PAGE  ~810

| PAGE NUMBER | INPUT TRAY | PAPER SIZE | ... | ROTATE |
|---|---|---|---|---|
| 1 | TRAY 1 | A4 | ... | BEFORE PAGE |
| 2 | TRAY 2 | B5 | ... | AFTER PAGE |
| 7 | TRAY 6 | A5 | ... | AFTER PAGE |

FIG.20B

■EXCEPTION PAGE  ~820

| PAGE NUMBER | INPUT TRAY | PAPER SIZE | ... | ROTATE |
|---|---|---|---|---|
| 1-2 | TRAY 1 | A4 | ... | 0 |
| 3-4 | TRAY 2 | B5 | ... | 90 |
| 7-8 | TRAY 3 | A4 | ... | 0 |

FIG.20C

■TAB SHEET  ~830

| PAGE NUMBER | INPUT TRAY | PAPER SIZE | ... | ROTATE |
|---|---|---|---|---|
| 5 | TRAY 3 | LETTER | ... | BEFORE PAGE |
| 6 | TRAY 4 | LETTER | ... | AFTER PAGE |
| 8 | TRAY 7 | LETTER | ... | AFTER PAGE |

| PAGE NUMBER | INPUT TRAY | PAPER SIZE | ... | ROTATE |
|---|---|---|---|---|
| 1-10 | TRAY 1 | A4 | ... | 0 |
| 5 | TRAY 2 | A4 | ... | 0 |
|  |  |  |  |  |

820     711

⇩ DIVIDE (b)

| PAGE NUMBER | INPUT TRAY | PAPER SIZE | ... | ROTATE |
|---|---|---|---|---|
| 1-4 | TRAY 1 | A4 | ... | 0 |
| 5 | TRAY 2 | A4 | ... | 0 |
| 6-10 | TRAY 1 | A4 | ... | 0 |

820     720

FIG.24
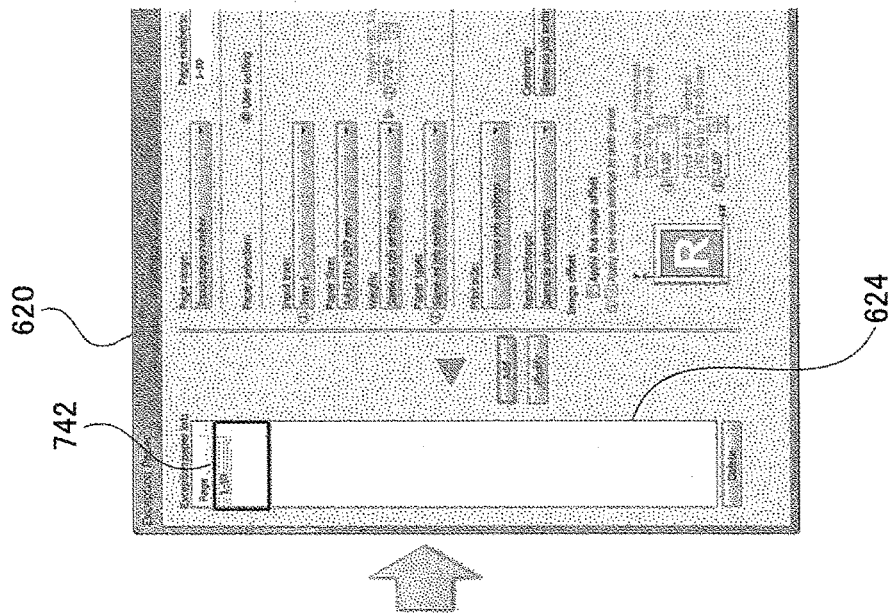
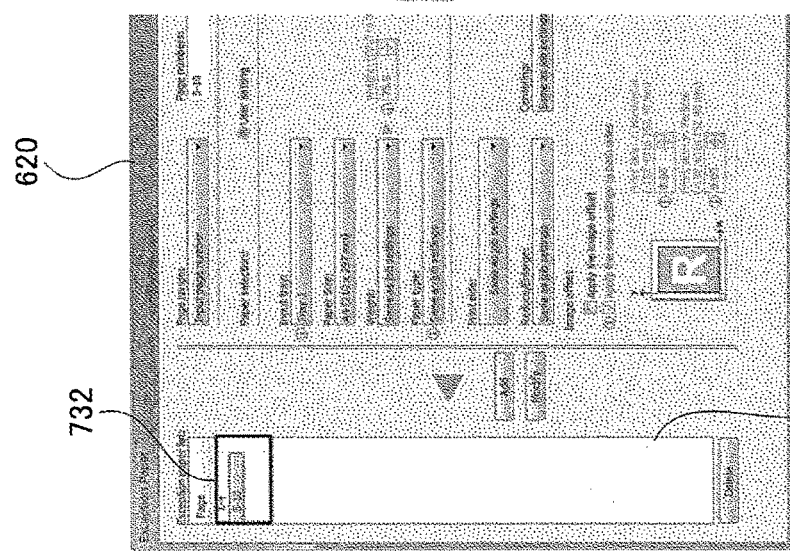

| PAGE NUMBER | INPUT TRAY | PAPER SIZE | ... | ROTATE |
|---|---|---|---|---|
| 1-4 | TRAY 1 | A4 | ... | 0 |
| 5-10 | TRAY 1 | A4 | ... | 0 |
|  |  |  |  |  |

820  751

⇩ UNITE (b)

| PAGE NUMBER | INPUT TRAY | PAPER SIZE | ... | ROTATE |
|---|---|---|---|---|
| 1-10 | TRAY 1 | A4 | ... | 0 |
|  |  |  |  |  |
|  |  |  |  |  |

820  761

PRINT CONTROL METHOD TO DISPLAY PRINT SETTINGS, RECORDING MEDIUM, AND PRINT CONTROL APPARATUS

BACKGROUND OF THE INVENTION

1. Field of the Invention

The disclosures herein generally relate to a printer driver for a computer to execute for controlling a printer, and a print control method, a recording medium, and a print control apparatus for controlling a printer.

2. Description of the Related Art

In production printing whose targets are an in-house printing department of a company, a print shop or the like, a print output itself is a product in many cases. Because of this, it is desired for a printer for the production printing that it outputs not an easy print job such as a conventional office print job but a high value-added print job in which a different print media type and a different print setting are provided for each page. As a technology for realizing this kind of print setting for each page, there is a function called a "special page". As a "special page", there is an "insert page", an "exception page" or the like. The "insert page" is a function for newly inserting into a specified location of a set of jobs a page different from the jobs. In addition, the "exception page" is a function for applying a print setting different from a set of jobs to a specified page range. In the "exception page", print settings for a print sheet, post-processing, colors, and the like can be set differently from the jobs.

In the conventional printer driver, an "exception page" is utilized in the following procedure. FIG. 30 illustrates a list display screen 910 of registered "special pages" in the conventional printer driver, and FIG. 31 illustrates an exception page setting edit screen 920 in the conventional printer driver. In the list display screen 910 shown in FIG. 30, a list of "special pages" registered by a user is shown in a list 911. In this example, in the list 911, two "special pages" are listed using one line per page. From this state shown in FIG. 30, in order to edit one of the "special pages", a line 912 for the edit target "special page" is selected from the list 911.

Then, when an [edit . . . ] button 913 is pressed, the exception page setting edit screen 920 shown in FIG. 31 is displayed. The user sets each of setting items of the "exception page" selected in the exception page setting edit screen 920. In the exception page setting edit screen 920, only one "exception page" selected as the line 912 of the list 911 shown in FIG. 30 can be edited, and it is impossible to edit a plurality of the "exception pages" together in one edit screen.

Editing of an "insert page" can also be performed according to a similar procedure. FIG. 32 illustrates an insert page setting edit screen 930 in the conventional printer driver. This insert page setting edit screen 930 has a similar configuration as the exception page setting edit screen 920 and it is impossible to edit a plurality of "insert pages" together.

In Patent Document 1, a printer driver is described in which exception settings ("special page") can be specified in detail for each page, and a page range to which the exception settings are to be applied can be specified easily. This printer driver includes a means for specifying print conditions, a means for saving as standard patterns combinations of standard print conditions and standard drawing data representing drawing content of document data, a means for inserting a separation sheet, replacing a particular sheet with another sheet that has already been printed, and storing combinations of standard print conditions and standard drawing data as print application patterns, a means for spooling for each page, document print conditions and document drawing data included in the document data, a means for detecting a standard pattern which is closest to each specific page range, a means for referring to the print application pattern corresponding to the detected standard pattern and generating print conditions for each page for the specific page range, and a means for generating print data from the document drawing data or the standard drawing data.

However, in the conventional printer driver, in the case where it is desired to edit a plurality of the "special pages" together, the exception page setting edit screen 920 shown in FIG. 31 is required to be invoked as many times as needed. Therefore, the number of times the exception page setting edit screen 920 is opened increases as the number of "special pages" to be edited increases, thereby increasing the user burden.

In other words, in the conventional printer driver, it works on the premise that the user should register and edit each of the "special pages" one by one. Because of this, it works on the premise that the operation should be performed using two types of screens including a screen A: a screen for displaying a list of registered "special pages" (the list display screen 910 in FIG. 30) and a screen B: a screen for editing settings of individual "special pages" (the exception page setting edit screen 920 in FIG. 31 and the insert page setting edit screen 930 in FIG. 32). In order to edit the "special page", it is required for a user to select one of the "special pages" in the screen A, invoke the screen B and edit the settings in the screen B.

Because of this, in the case of editing a plurality of the "special pages", it is required to open the screen B many times, which is a big burden for a user. The printer driver described in Patent Document 1 also has a similar problem as far as editing "special pages" is concerned.

[Patent Document 1] Japanese Patent Application Publication No. 2013-12033

SUMMARY OF THE INVENTION

It is a general object of at least one embodiment of the present invention to provide a method that substantially obviates one or more problems caused by the limitations and disadvantages of the related art described above.

In order to solve the above problems, a print control method according to an embodiment of the present invention is a print control method for an information processing apparatus including a registration step of accepting via a setting screen a registration of a print setting for one or more specific pages of a print target consisting of one or more pages, a storage step of storing in a storage device the print setting accepted in the registration step with corresponding identification information identifying the specific pages, a first displaying step of displaying on the setting screen the identification information of the specific pages stored in the storage step, a selection step of accepting via the setting screen a selection of identification information displayed in the first displaying step, and a second displaying step of displaying on the setting screen the print setting corresponding to the identification information whose selection is accepted in the selection step.

According to the embodiments of the present invention, regarding the "special pages" to each of which desired print settings are applied, a plurality of the "special pages" can be edited in a single screen, thereby convenience of users can be improved and users' burden can be reduced.

BRIEF DESCRIPTION OF THE DRAWINGS

Other objects and further features of embodiments will become apparent from the following detailed description when read in conjunction with the accompanying drawings, in which

FIG. 19 is a flowchart illustrating an update process of special page information in the printer driver;

FIGS. 20A, 20B and 20C are drawings illustrating management tables for the special pages in the printer driver, where FIG. 20A is a drawing illustrating an insert page table, FIG. 20B is a drawing illustrating an exception page table, and FIG. 20C is a drawing illustrating a tab sheet table;

FIG. 22 is a drawing illustrating changes of internal states (a) and (b) before and after performing a special page division process in the printer driver;

FIG. 24 is a drawing illustrating display images (a) and (b) before and after performing a uniting process in the printer driver;

FIG. 25 is a drawing illustrating internal data (a) and (b) before and after performing a special page uniting process in the printer driver;

DESCRIPTION OF THE PREFERRED EMBODIMENTS

In the following, a printer driver and a print control apparatus according to an embodiment of the present invention will be described with reference to the accompanying drawings. The printer driver and the print control apparatus set print settings of a print target including one or more pages including a "special page" that typically includes an "exception page", an "insert page", a "tab sheet" or the like. This process corresponds to a registration step. Here, an add function, a delete function, a division function, a uniting function, an update function and a list generation function are included in a special page edit screen that is displayed in a first displaying step so that a plurality of the "special pages" can be selected and print settings of the "special pages" can be edited together in a single edit screen. These processes correspond to a selection step and a modification step. Then, an edit screen after the modification is displayed. This process corresponds to a second displaying step. The print settings of the selected "special pages" with corresponding identification information for identifying the "special pages" are stored. This process corresponds to a storage step. With these processes described above, operation steps for editing the "special pages" can be reduced.

As described above, as a "special page", there is an "insert page", an "exception page" or the like. The "insert page" (page insert information) is a function for newly inserting into a specified location of a set of jobs a page different from the jobs. In addition, the "exception page" is a function for applying a print setting different from a set of jobs to a specified page range. In the "exception page", print settings for a print sheet, post-processing, colors, and the like can be set differently from the jobs.

The "add function" is a function for adding a new special page to a set of "special pages". The "delete function" is a function, which is performed in a delete step, for deleting a specific "special page" from a set of "special pages". The "division function" is a function for, in the case where a "special page" with a different setting is added to a set of "special pages", dividing the set of "special pages" into before and after the added "special page". The "uniting function" is a function for, in the case where "special pages" with the same settings are added before or after existing "special pages", uniting all of the "special pages". The "update function" is a function for updating settings in each of the functions. The "list generation function" is a function, which is performed in a list generation step, for generating a list of "special pages" in a state after each of the functions is performed.

Figure 1:
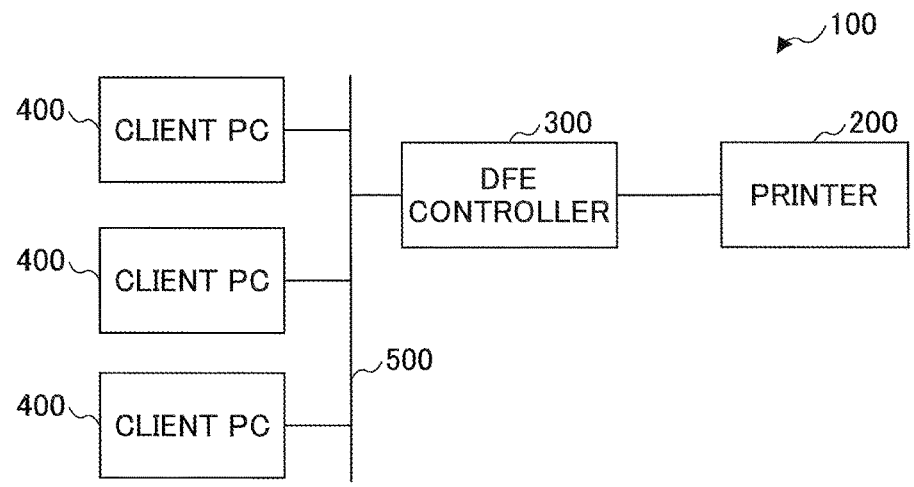
FIG. 1 is a block diagram illustrating an overall structure of an image forming system according to an embodiment of the present invention.

In the following, a printer driver and a print control apparatus according to an embodiment of the present invention will be described in detail with reference to the accompanying drawings. FIG. 1 shows a block diagram illustrating an overall structure of an image forming system (print system) 100 according to an embodiment of the present invention. The print system 100 includes a printer 200, a DFE (Digital Front End) controller 300, client PCs 400 which are computers, and a network 500. In this embodiment, the client PCs 400 are connected via the network 500 to the DFE controller 300 and the printer 200.

A user of the print system 100, by operating a client PC 400, sets print settings and issues print commands by transmitting a job ticket to the DFE controller 300 via the network 500. The DFE controller 300 interprets the received ticket and outputs a print command to the printer 200.

Figure 2:
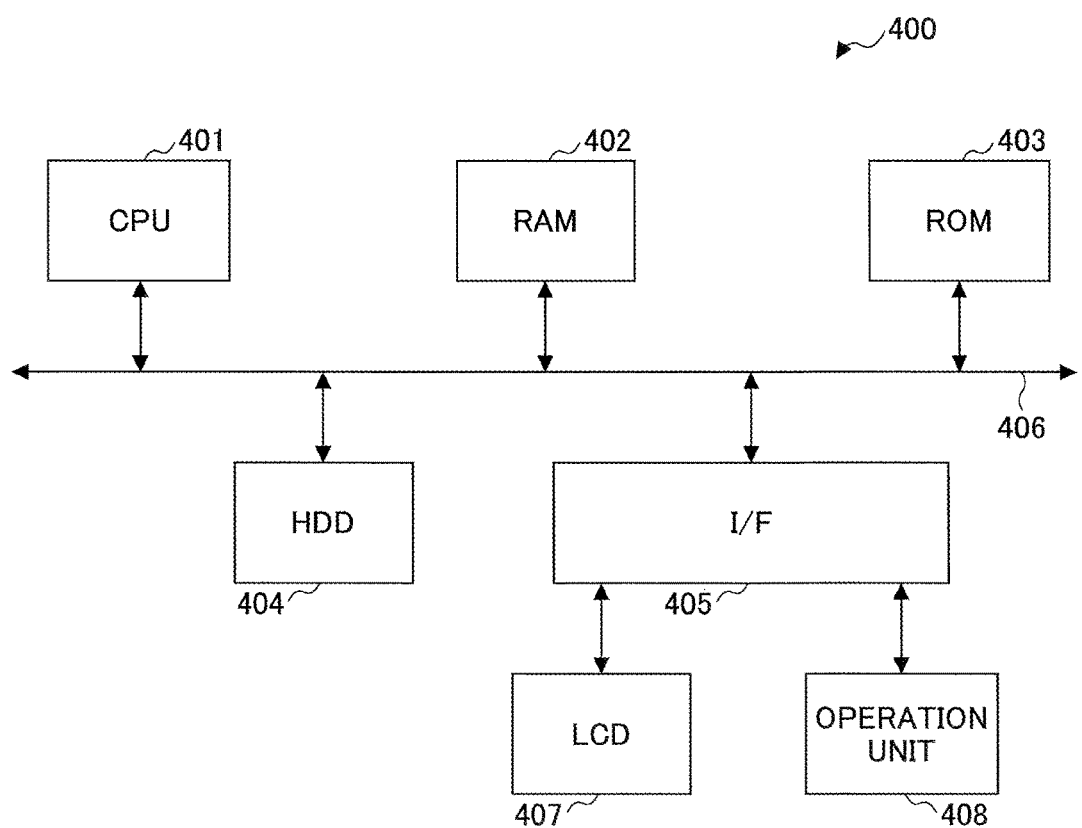
FIG. 2 is a block diagram illustrating a structure of a client PC of an image forming system according to an embodiment of the present invention.

FIG. 2 is a block diagram illustrating a structure of a client PC 400 of an image forming system according to an embodiment of the present invention. The client PC 400 according to the embodiment includes a structure similar to a typical information processing terminal. In other words, the client PC 400 includes a CPU (Central Processing Unit) 401, a RAM (Random Access Memory) 402, a ROM (Read Only Memory) 403, an HDD (Hard Disk Drive) 400 as a storage device, and an I/F 405, which are connected to each other via a bus 406. Also, to the I/F 405, an LCD (Liquid Crystal Display) 407 as an image display device and an operation unit 408 including a keyboard, a mouse and the like, are connected.

The CPU 401 is a means for calculation and controls overall operations of the client PC 400. The RAM 402 is a volatile storage device capable of fast reading and writing of information, and used as a work area for information processing of the CPU 401. The ROM 403 is a read-only non-volatile storage medium in which programs including firmware are stored. The HDD 404 is a non-volatile storage medium capable of reading and writing information in which an OS (Operating System), various control programs, application programs and the like are stored. The I/F 405 connects the bus 406 with various kinds of hardware, a network and the like, and controls them. The LCD 407 is a visual user interface for a user to check the state of the client PC 400. The operation unit 408 is a user interface for a user to input information for the client PC 400.

Figure 3:
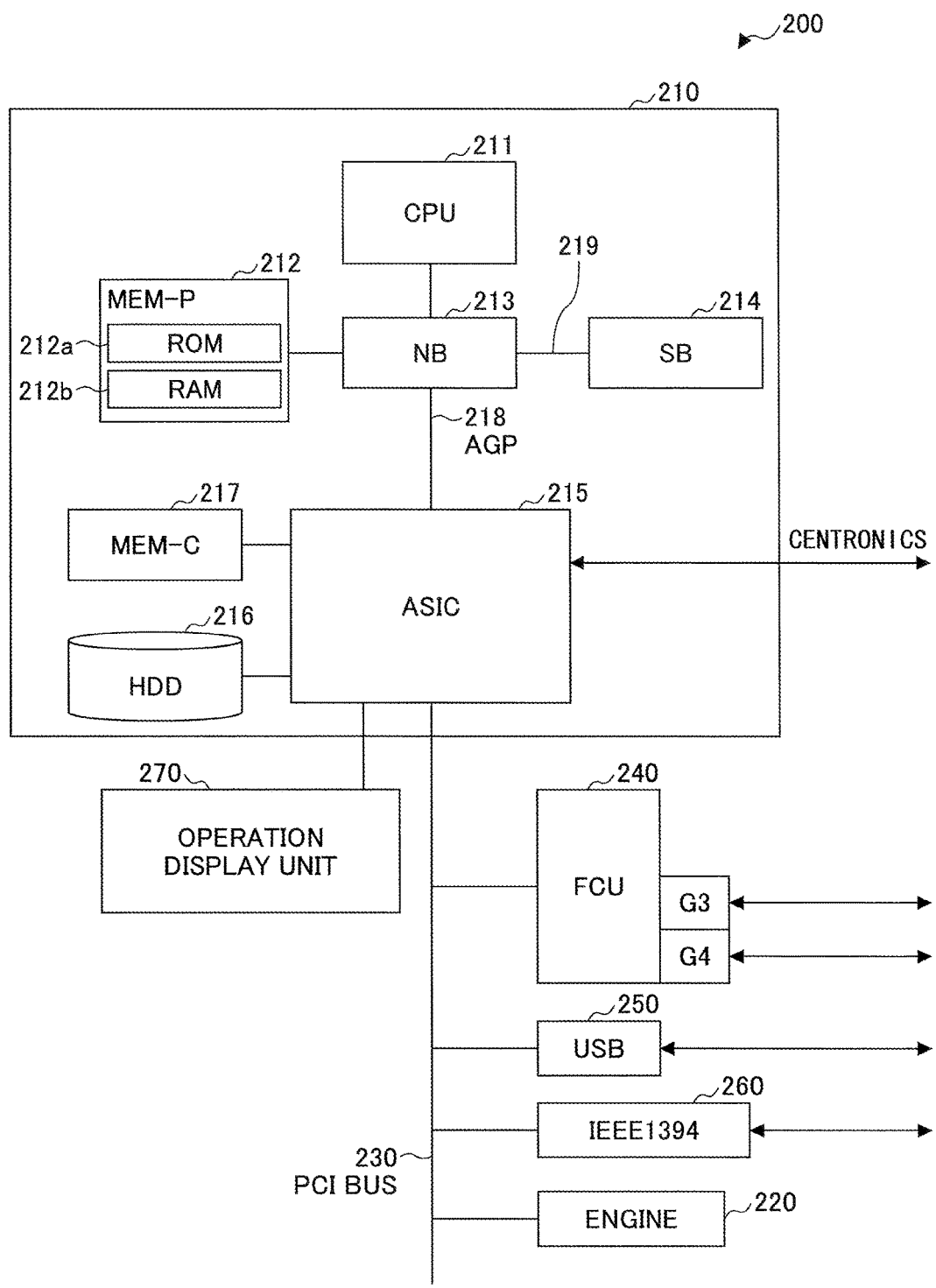
FIG. 3 is a block diagram illustrating a structure of a printer of an image forming system according to an embodiment of the present invention.

FIG. 3 is a block diagram illustrating a structure of a printer 200 of an image forming system according to an embodiment of the present invention. The printer 200 includes a controller 210 and an engine unit (Engine) 220 which are connected by a PCI (Peripheral Component Interface) bus 230. The controller 210 performs overall control of the printer 200 and controls image drawing, communications, and an input from an operation unit (not shown). The engine unit 220, connected to the PCI bus 230, is, for example, a black and white plotter, a one-drum color plotter, a four-drum color plotter, a scanner, a fax unit or the like, which is well known to the public. It should be noted that the engine unit 220 includes, in addition to a so-called engine component such as a plotter, an image processing component for error diffusion, gamma conversion or the like.

The controller 210 includes a system memory (MEM-P) 212, a North Bridge (NB) 213, a South Bridge (SB) 214, a local memory (MEM-C) 217, an ASIC (Application Specific Integrated Circuit) 215 and a hard disk drive (HDD) 216. The North Bridge 213 and the ASIC 215 are connected via an AGP (Accelerated Graphic Port) bus 218.

In addition, the system memory 212 includes a ROM 212a and a RAM 212b. The CPU 211, which performs overall control of the printer 200, includes a chipset including the system memory 212, the North Bridge 213 and the South Bridge 214 and is connected to other devices via the chipset.

The North Bridge 213 connects the CPU 211, the system memory 212, the South Bridge 214 and the AGP bus 218, and includes a memory controller for control of reading/writing from/to the system memory 212, a PCI master and an AGP target. The system memory 212 is used for storing programs and data, for reading and writing the programs and data, for image drawing of the printer or the like.

The ROM 212a is a read only memory used for storing the programs and data, and the RAM 212b is a memory capable of reading and writing the programs and data and as a memory for image drawing of the printer. The South Bridge 214 connects the North Bridge 213 with PCI devices and peripheral devices.

The South Bridge 214 is connected to the North Bridge 213 via the PCI bus 219, and a network interface (I/F) component (not shown) or the like is connected to this PCI bus 219. The ASIC 215 is an IC (Integrated Circuit) for use in image processing that includes a hardware element for image processing, and is connected to the AGP bus 218, the PCI bus 230, the HDD 216 and the local memory 217.

The ASIC 215 includes the PCI target and the AGP master, an arbiter (ARB) which forms the core of the ASIC 215 and a memory controller which controls the local memory 217. Also, the ASIC 215 includes a plurality of DMACs (Direct Memory Access Controller) which perform rotation of image data using hardware logic and a PCI unit which performs data transfer with the engine unit 220 via the PCI bus 230.

To the ASIC 215, a FCU (Facsimile Control Unit) 240, a USB (Universal Serial Bus) interface 250 and an IEEE (the Institute of Electrical and Electronics Engineers) 1394 interface 260 are connected via the PCI bus 230.

An operation display unit 270 is directly connected to the ASIC 215. The local memory 217 is used as an image buffer for copying and a code buffer. The HDD 216 is a storage for performing accumulation of image data, accumulation of programs, accumulation of font data and accumulation of forms. Also, the HDD 216 stores license files of applications the printer 200 executes.

The AGP bus 218 is a bus interface for a graphic accelerator card for accelerating graphic processes, and assists the graphic accelerator card by directly accessing the system memory 212 with a high throughput.

Figure 4:
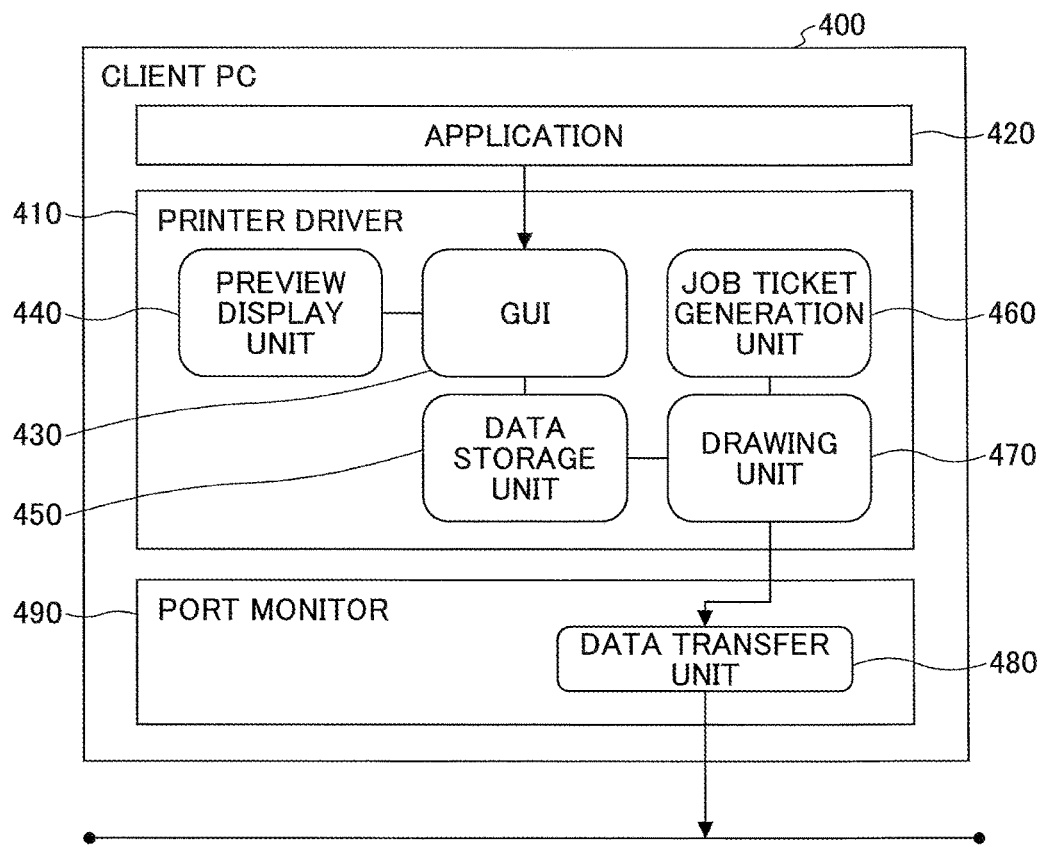
FIG. 4 is a block diagram illustrating a functional structure of a client PC of an image forming system according to an embodiment of the present invention.

FIG. 4 is a block diagram illustrating a functional structure of the client PC 400 of the image forming system according to an embodiment of the present invention. The client PC 400 includes an application 420, a GUI generation unit 430, a preview display unit 440, a data storage unit 450, a job ticket generation unit 460, a drawing unit 470 and a data transfer unit 480. The GUI generation unit 430, the preview display unit 440, the data storage unit 450, the job ticket generation unit 460 and the drawing unit 470 constitute a printer driver 410, and the data transfer unit 480 constitutes a port monitor 490.

The application 420 is software such as word processing software. The GUI generation unit 430 is launched by the application 420 and configured to generate a graphical user interface for setting a print setting. In this interface, discovered "special pages" information is reflected. The preview display unit 440 displays a simple preview of the print settings. The data storage unit 450 stores the print setting specified by the user via the GUI 430. The job ticket generation unit 460 generates a job ticket which reflects settings in the data storage unit 450. The drawing unit 470 generates PDL data which can be interpreted by the printer. The data transfer unit 480 transmits the generated PDL data and the job ticket to the DFE controller 300. In the client PC 400, the printer driver 410 is implemented by execution of a program by the CPU 211. Also, instead of providing a printer driver implemented by execution of a program, a print control apparatus including hardware performing functions of the printer driver in the client PC 400 can be provided.

Figure 5:
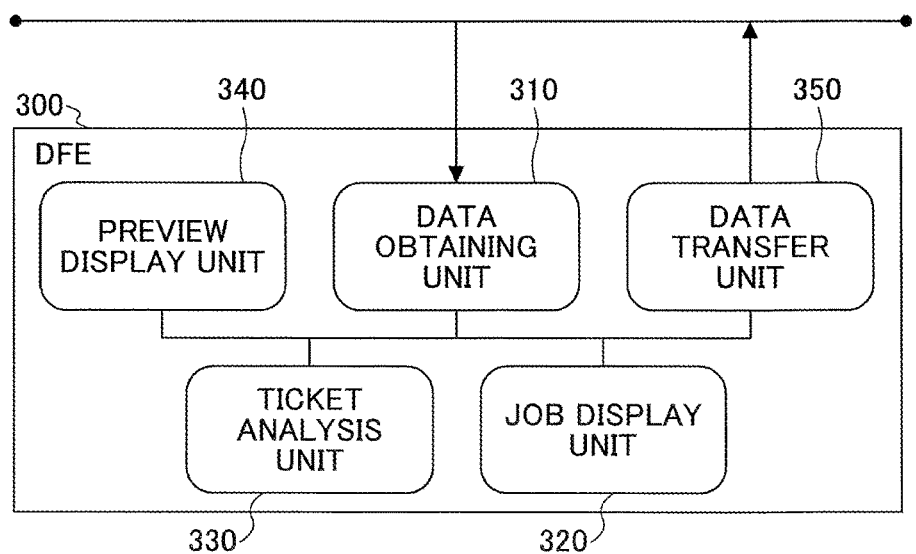
FIG. 5 is a block diagram illustrating a functional structure of a DFE controller of an image forming system according to an embodiment of the present invention.

FIG. 5 is a block diagram illustrating a functional structure of the DFE controller 300 according to an embodiment of the present invention. The DFE controller 300 includes a data obtaining unit 310, a job display unit 320, a ticket analysis unit 330, a preview display unit 340 and a data transfer unit 350. The job display unit 320 is a user interface for displaying obtained print data as a job. The ticket analysis unit 330 analyzes the content of the received job ticket and reads the print settings. The preview display unit 340 displays a preview based on the analyzed print settings and the PDL data. The data transfer unit 350 transfers the print data to the printer body.

Figure 6:
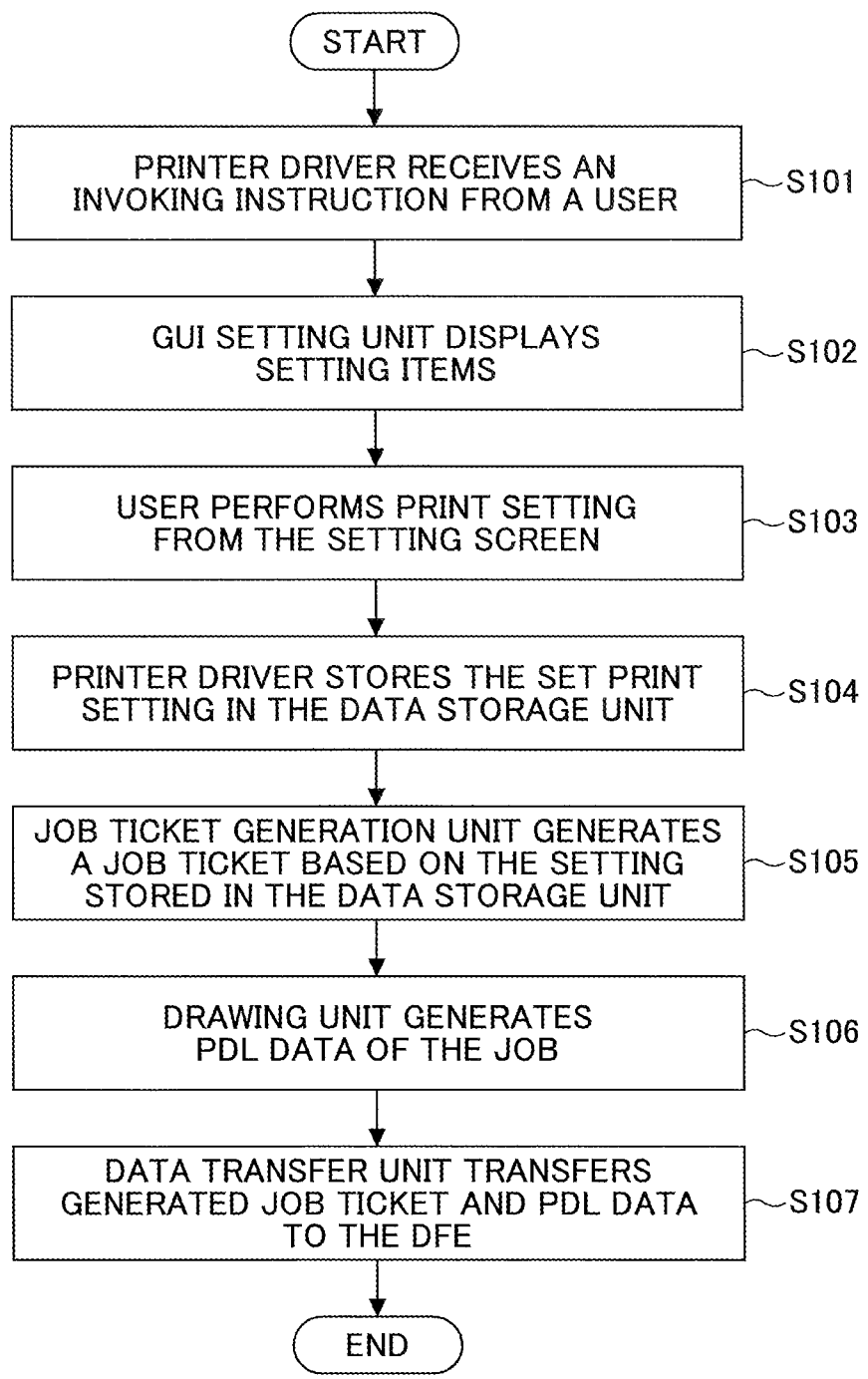
FIG. 6 is a flowchart illustrating a basic procedure for transmitting a print instruction to a DFE controller from a printer driver in an image forming system according to an embodiment of the present invention.

FIG. 6 is a flowchart illustrating a basic procedure for transmitting a print instruction to the DFE controller 300 from the printer driver 410 in the image forming system 100. It should be noted that the flowchart shown in FIG. 6 includes a procedure (from step S102 to step S104) for setting the print setting of the "special page" ("exception page", "insert page" or "tab sheet"). This procedure will be described in detail later by referring to the flowchart shown in FIG. 11.

First, the client PC 400 is operated by the user, and the printer driver 410 receives an invoking instruction from the user (step S101). As a result, the GUI generation unit 430 generates a special page setting screen and displays it on the LCD 407 (step S102). The user, by operating the operation unit 408, sets the print setting from the setting screen (step S103). Based on the print setting set by the user, the printer driver 410 stores the set data in the data storage unit 450 (step S104).

Furthermore, based on the set data stored in the data storage unit 450, the job ticket generation unit 460 generates a job ticket (step S105). The drawing unit 470 generates a PDL (Page Description Language) data of the job (step S106). The PDL data are data describing an output image for the printer used for instruction for the printer. Then, the data transfer unit 480 transfers the generated job ticket and the PDL data to the DFE 300 (step S107). The printer 200 receives them and performs printing.

In the printer driver according to the embodiment, already-registered "special pages" can be displayed in a list on the LCD 407 as a special page list display screen.

Figure 7:
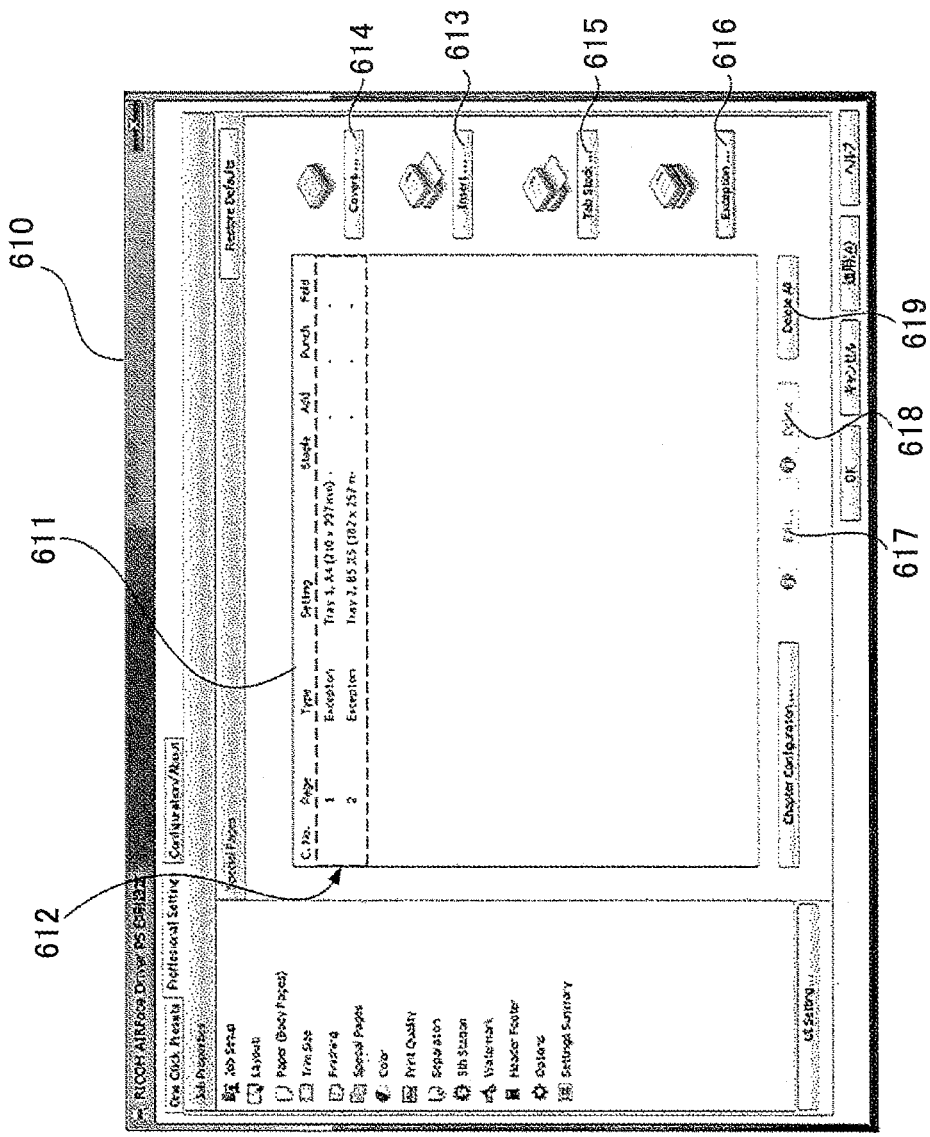
FIG. 7 is a drawing illustrating a special page list display screen in the printer driver.

FIG. 7 is a drawing illustrating a special page list display screen 610 in the printer driver. Based on the user instruction from the client PC 400, the GUI generation unit 430 generates the special page list display screen 610 and displays the special page list display screen 610 on the LCD 407. In this special page list display screen 610, a list 611 of the registered "special pages" are displayed.

In this example, in the list 611, two "exception pages" 612 are displayed on the LCD 407. Also, in the special page list display screen 610, an add button 613 for newly registering an "insert page", add buttons 614, 615 and 616 for newly registering a "cover page", a "tab sheet", and an "exception page" as the "special pages" are displayed. Furthermore, in the special page list display screen 610, an edit button 617 and a delete button 618 for the selected "special page" and a delete all button 619 are displayed.

Figure 8:
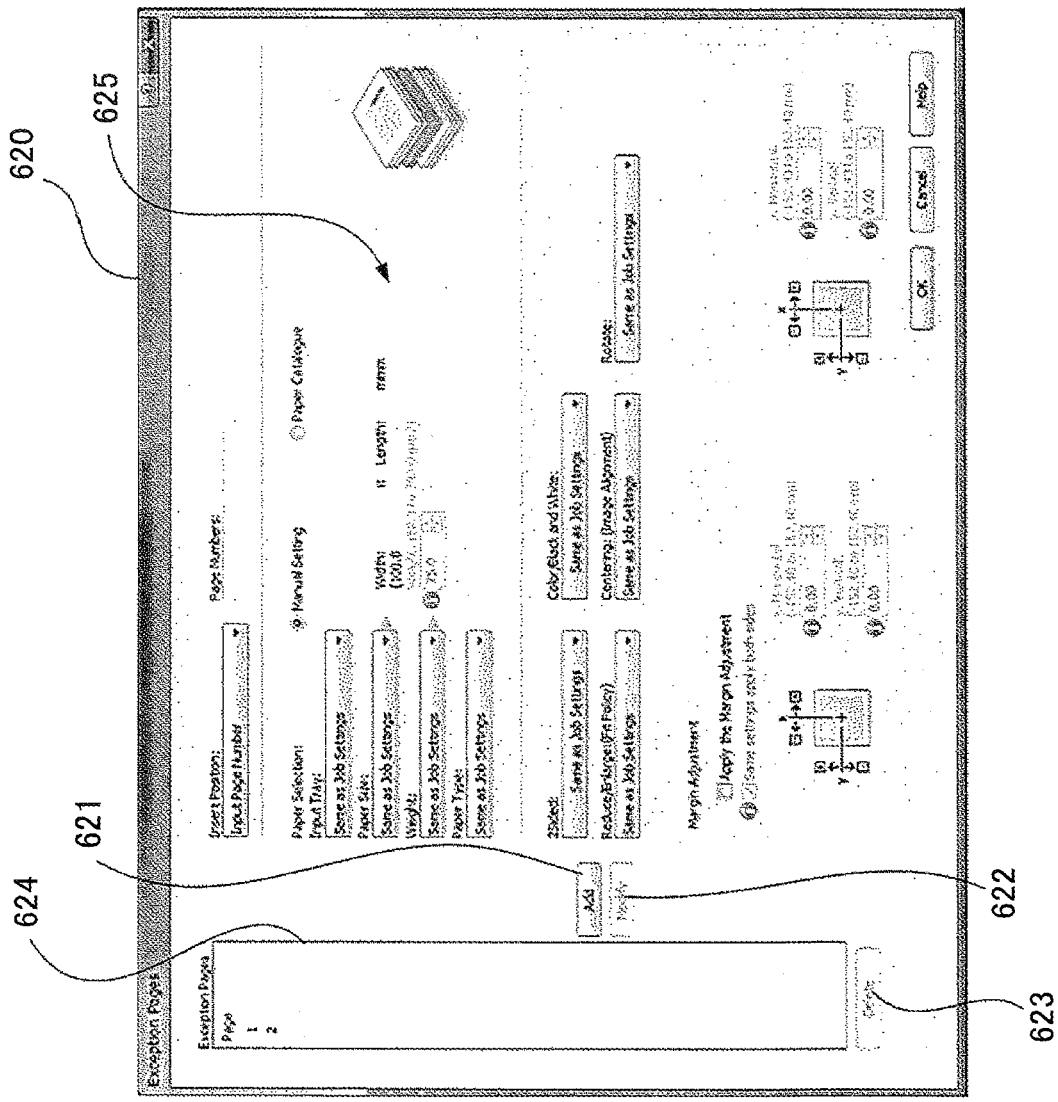
FIG. 8 is a drawing illustrating an exception page setting edit screen in the printer driver.
Figure 9:
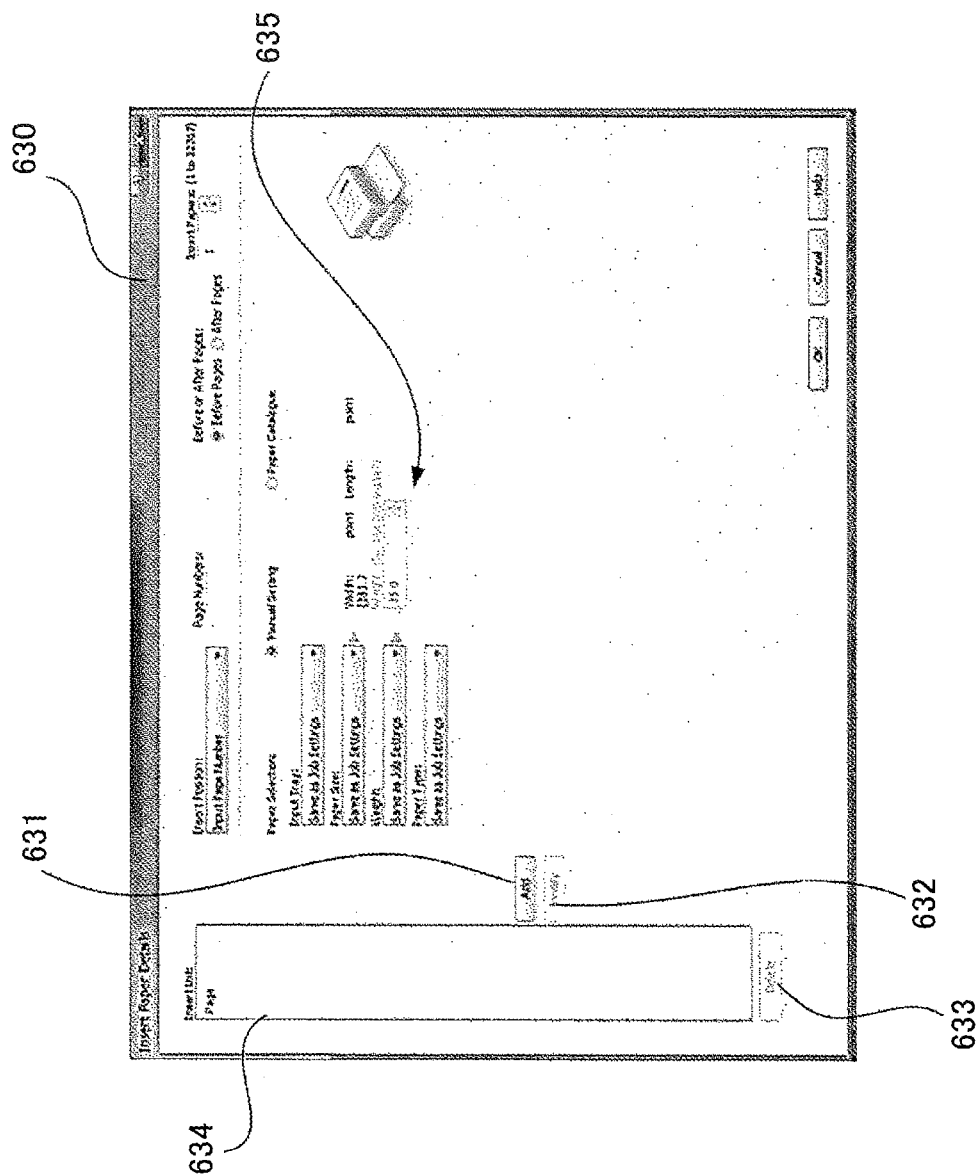
FIG. 9 is a drawing illustrating an insert page setting edit screen in the printer driver.
Figure 10:
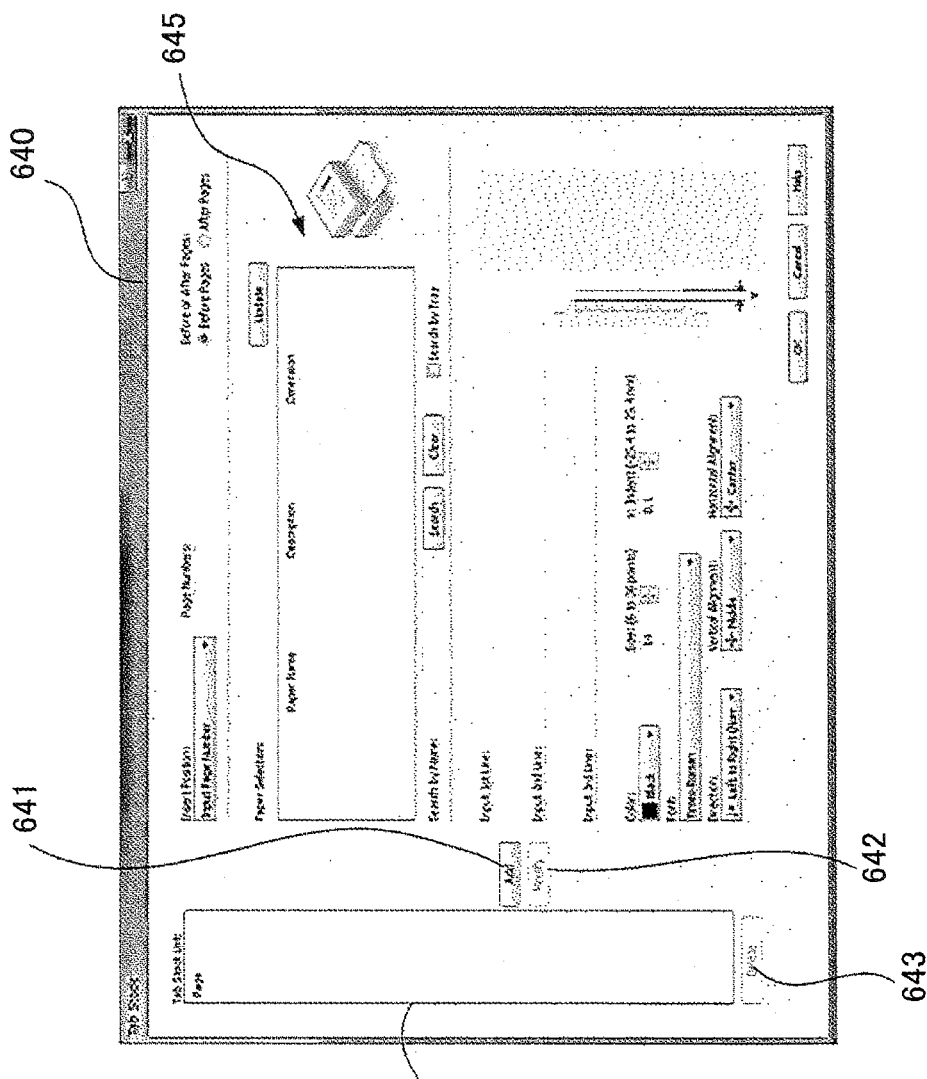
FIG. 10 is a drawing illustrating a tab sheet setting edit screen in the printer driver.

Then, a setting edit screen for "exception pages", "insert pages" and "tab sheets" as "special pages" will be described. FIG. 8 is a drawing illustrating the exception page setting edit screen 620 in the printer driver 410, FIG. 9 is a drawing illustrating an insert page setting edit screen 630 in the printer driver 410, and FIG. 10 is a drawing illustrating a tab sheet setting edit screen 640 in the printer driver 410. These setting edit screens are invoked by the add buttons 613, 614, 615, and 616, and invoked by the edit button 617 after specifying an edit target "special page" from the list 611.

In the exception page setting edit screen 620, as shown in FIG. 8, an add button 621 for adding a new "exception page", an update button 622 for updating settings of registered "exception pages" and a delete button 623 for deleting registered "exception pages" are displayed on the LCD 407. In the exception page setting edit screen 620, a list 624 which shows a list of registered "special pages" and setting buttons 625 for various types of formats are displayed on the LCD 407. As a result, without transitioning to other screens, a plurality of the "exception pages" can be added, edited and deleted in the exception page setting edit screen 620 alone.

Also, in the insert page setting edit screen 630, as shown in FIG. 9, an add button 631 for adding a new "insert page", an update button 632 for updating settings of registered "insert pages" and a delete button 633 for deleting registered "insert pages" are displayed on the LCD 407. Furthermore, in the insert page setting edit screen 630, a list 634 which shows a list of registered "insert pages" and setting buttons 635 for various types of formats are displayed on the LCD 407. As a result, without transitioning to other screens, a plurality of the "insert pages" can be added, edited and deleted in the insert page setting edit screen 630 alone.

Furthermore, in the tab sheet setting edit screen 640, as shown in FIG. 10, an add button 641 for adding a new "tab sheet", an update button 642 for updating settings of registered "tab sheets" and a delete button 643 for deleting registered "tab sheets" are displayed on the LCD 407. Furthermore, in the tab sheet setting edit screen 640, a list 644 which shows a list of registered "insert pages" and setting buttons 645 for various types of formats are displayed on the LCD 407. As a result, without transitioning to other screens, a plurality of the "tab sheets" can be added, edited and deleted in the tab sheet setting edit screen 640 alone. It should be noted that a tab sheet is a sheet with sticking out portion on which a certain index can be printed.

Figure 11:
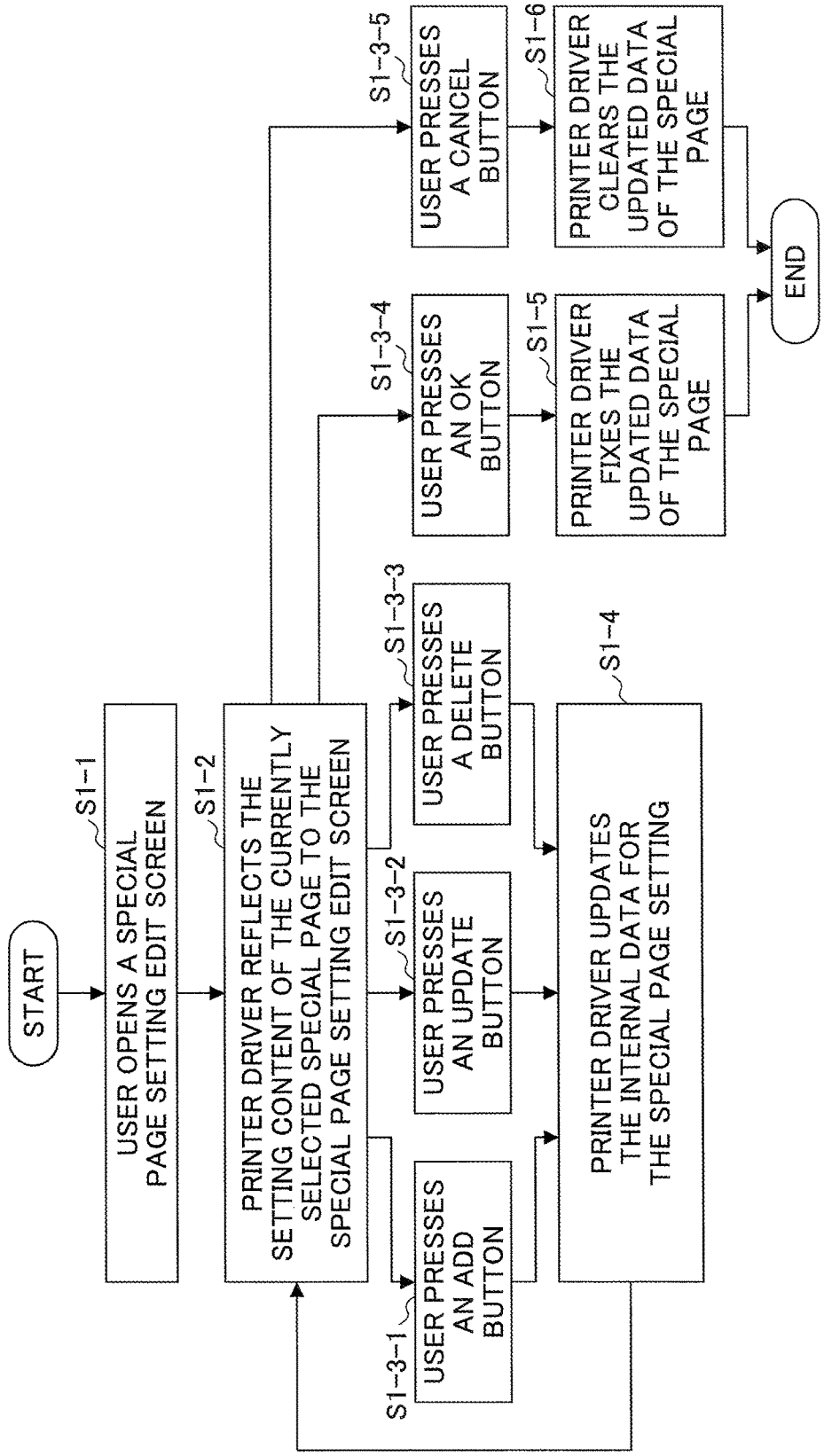
FIG. 11 is a flowchart illustrating operations of a special page edit screen in the printer driver.

Next, editing procedures in the above exception page setting edit screen 620, the insert page setting edit screen 630 and the tab sheet setting edit screen 640, will be described. FIG. 11 is a flowchart illustrating operations of the special page edit screen in the printer driver 410.

A user performs editing of "exception pages" in the following procedure.

In step S1-1, upon receiving an instruction from a user, the printer driver 410 displays the special page setting edit screen.

Figures 16, 17:
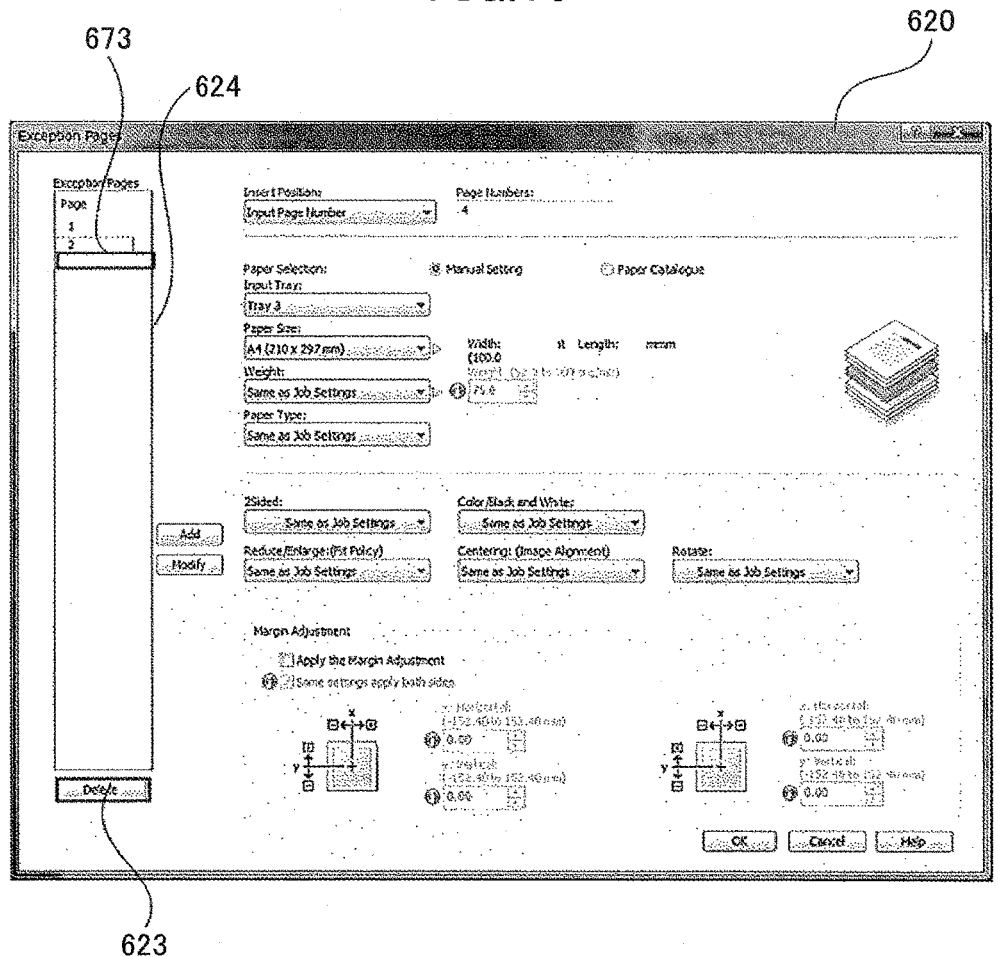
FIG. 16 is a drawing illustrating an "exception page" delete process in an exception page setting edit screen in the printer driver.
FIG. 17 is a drawing illustrating a table showing internal data when deleting an "exception page" in the printer driver.

Then, in step S1-2, the printer driver 410 obtains an identifier (e.g., a page number) of currently selected "special page", reads setting content of the currently selected "special page" by using the identifier, and reflects the setting content to the special page setting edit screen. This reflecting process is illustrated in FIG. 17 and will be described later.

As a result, the GUI generation unit 430 generates a special page setting edit screen and displays the special page setting edit screen on the LCD 407.

After specifying a "special page" and performing the setting, in the case where any one of the add, update, delete, OK, and cancel buttons is pressed, a button pressing of any one of the add, update, delete, OK, and cancel buttons is accepted in steps S1-3-1 through S1-3-5.

In step S1-4, the printer driver 410 accepts any one of requests of add, update, and delete, updates the internal data according to the request, and returns to step S1-2.

In step S1-5, the printer driver 410 receives a completion request of editing "special page" and fixes the updated internal data.

In step S1-6, the printer driver 410 receives a cancel request of editing "special page" and clears the updated internal data.

Figures 12, 13:
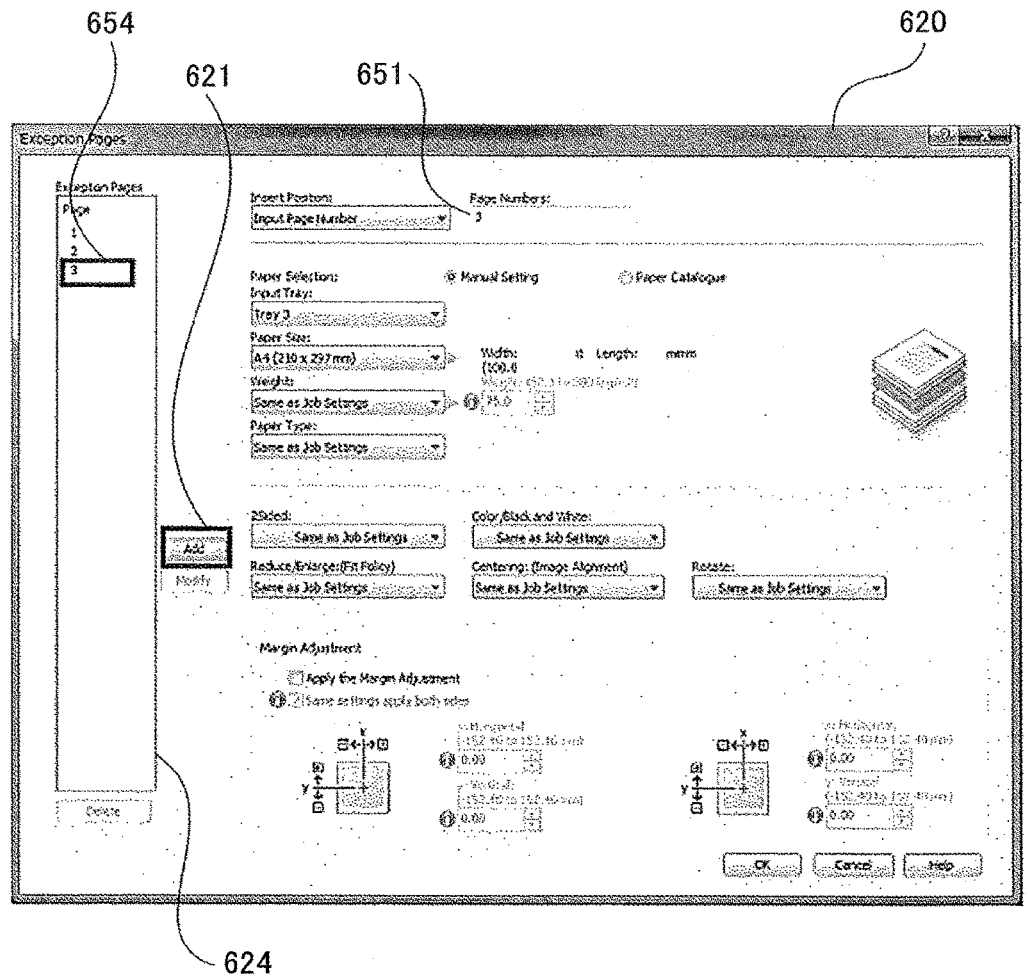
FIG. 12 is a drawing illustrating an "exception page" addition process in an exception page setting edit screen in the printer driver.
FIG. 13 is a drawing illustrating a table showing internal data stored in the printer driver.

In the procedures of editing the "special pages" including the "insert page", the exception page", and the "tab sheet", there is no difference except for the format settings for sheets. Therefore, in the following, the "exception page" is described as an example. First, adding an "exception page" will be described. FIG. 12 is a drawing illustrating an "exception page" adding process in the exception page edit screen in the printer driver 410, and FIG. 13 is a drawing illustrating a table showing internal data stored in the printer driver 410.

First, after a page location of the new "exception page" is specified (e.g., "Page Number"=>3) in an exception page specifying column 651 of the exception page edit screen, the add button 621 ([Add] button) is pressed. Then, a new "exception page" (line 654 "3") is added to the list 624. After this, input content of the "Page Number" may be changed and another new "exception page (e.g., "Page Number"=>4) may be added.

In this case, setting information of the "exception page" is internally stored as list type data. The printer driver 410 maintains "exception page" information using [Page number] as an identification key. When a "special page" is newly added as described above, a new line (data) is added to the internal data. In the table shown in FIG. 13, a placement tray, a sheet size and print information which are associated with the page number as identification information (identification key) are recorded. The newly added line is enclosed by a dotted line in FIG. 13 and a sign 655 is assigned to it.

In the processes described above, in the inside of the printer driver, special page setting information is stored as table type data. FIGS. 20A, 20B and 20C are drawings illustrating special pages in the printer driver.

The special page setting information, as shown in FIGS. 20A, 20B and 20C, is maintained by having an insert page table 810, an exception page table 820 and a tab sheet table 830 which are provided for corresponding types of special pages, that is, "insert page", "exception page" and "tab sheet". In each of the tables, the printer driver 410 maintains special page setting information by using a [Page Number] as an identification key. For example, as shown in FIG. 13, when a special page is newly added, a new data (line) is added to the table (it is enclosed in the dotted line in the table of FIG. 13 and the sign 655 is assigned to it).

When the special page list display screen 610 illustrated in FIG. 7 is displayed, a table for integrating each of the tables to display a special page list is generated. This process will be described later.

Figures 14, 15:
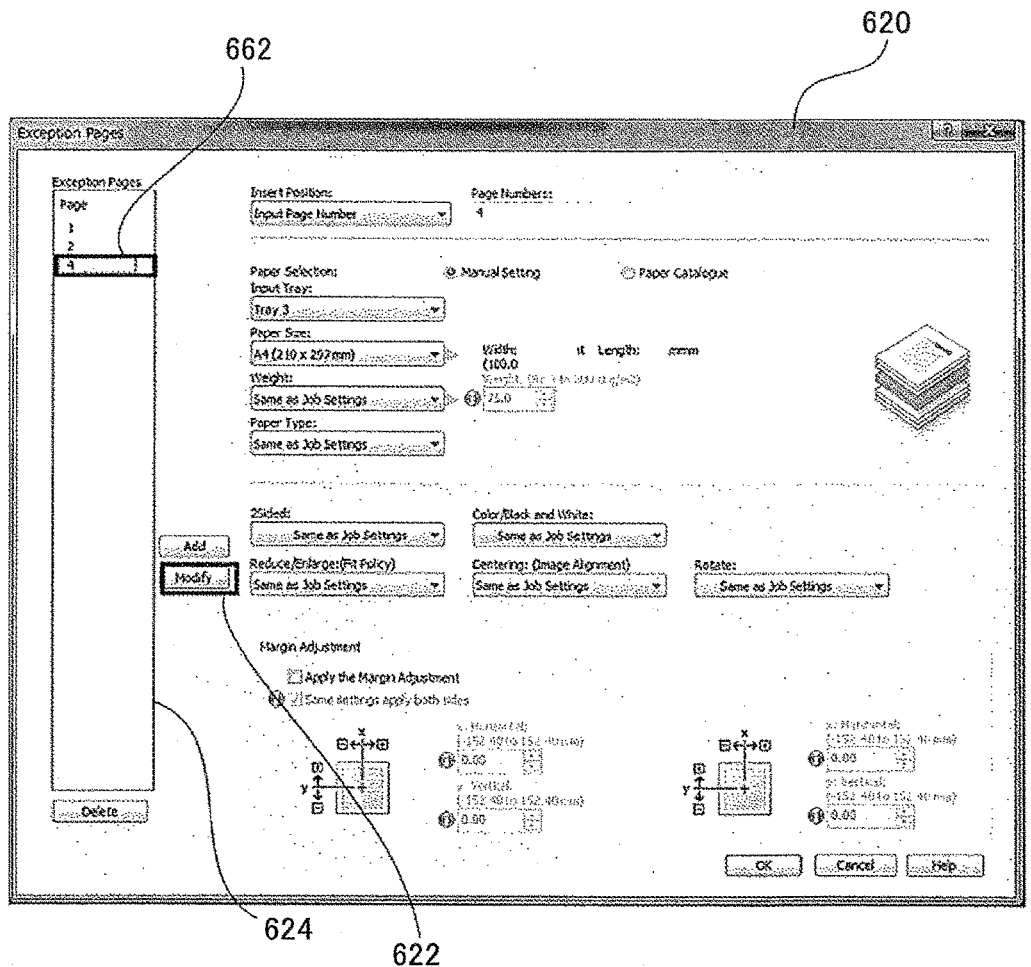
FIG. 14 is a drawing illustrating an "exception page" update process in an exception page setting edit screen in the printer driver.
FIG. 15 is a drawing illustrating a table showing internal data when editing an "exception page" in the printer driver.

Next, an "exception page" update process will be described. FIG. 14 is a drawing illustrating an "exception page" update process in the exception page edit screen in the printer driver 410, and FIG. 15 is a table illustrating internal data when editing the "exception page" in the printer driver 410.

The user selects the registered "exception page" (e.g., "Page Number=3") shown in the list 624 of the exception page setting edit screen 620. Then, the setting content of the selected "exception page" is reflected to the exception page setting edit screen 620. Then, after modifying the setting content of the "exception page" ("Page Number=4"), the user presses the update button 622 ([Modify] button). With this operation, the display of the selected "exception page" (the line "3") changes to "4" (this state is shown by a sign 662 in FIG. 14). At this time, in the internal data of the printer driver, the setting value of [PageNumber] is modified from "3" to "4" (this state is indicated by a dotted line frame with a sign 664 in FIG. 15).

Next, an "exception page" delete process will be described. FIG. 16 is a drawing illustrating an "exception page" delete process in the exception page edit screen in the printer driver 410, and FIG. 17 is a table illustrating internal data when deleting the "exception page" in the printer driver 410.

The user selects the registered "exception page" ("Page Number=4") shown in the list 624 of the exception page setting edit screen 620 and presses the delete button 623 ([Delete] button). Then, the selected "exception page" (the line "4") is deleted from the list 624 (the deleted area is indicated by a sign 673 in FIG. 16). At this time, in the internal data of the printer driver 410, the line of [PageNumber]=4 is deleted (this state is indicated by a dotted line frame with a sign 674 in FIG. 17).

Figure 18:
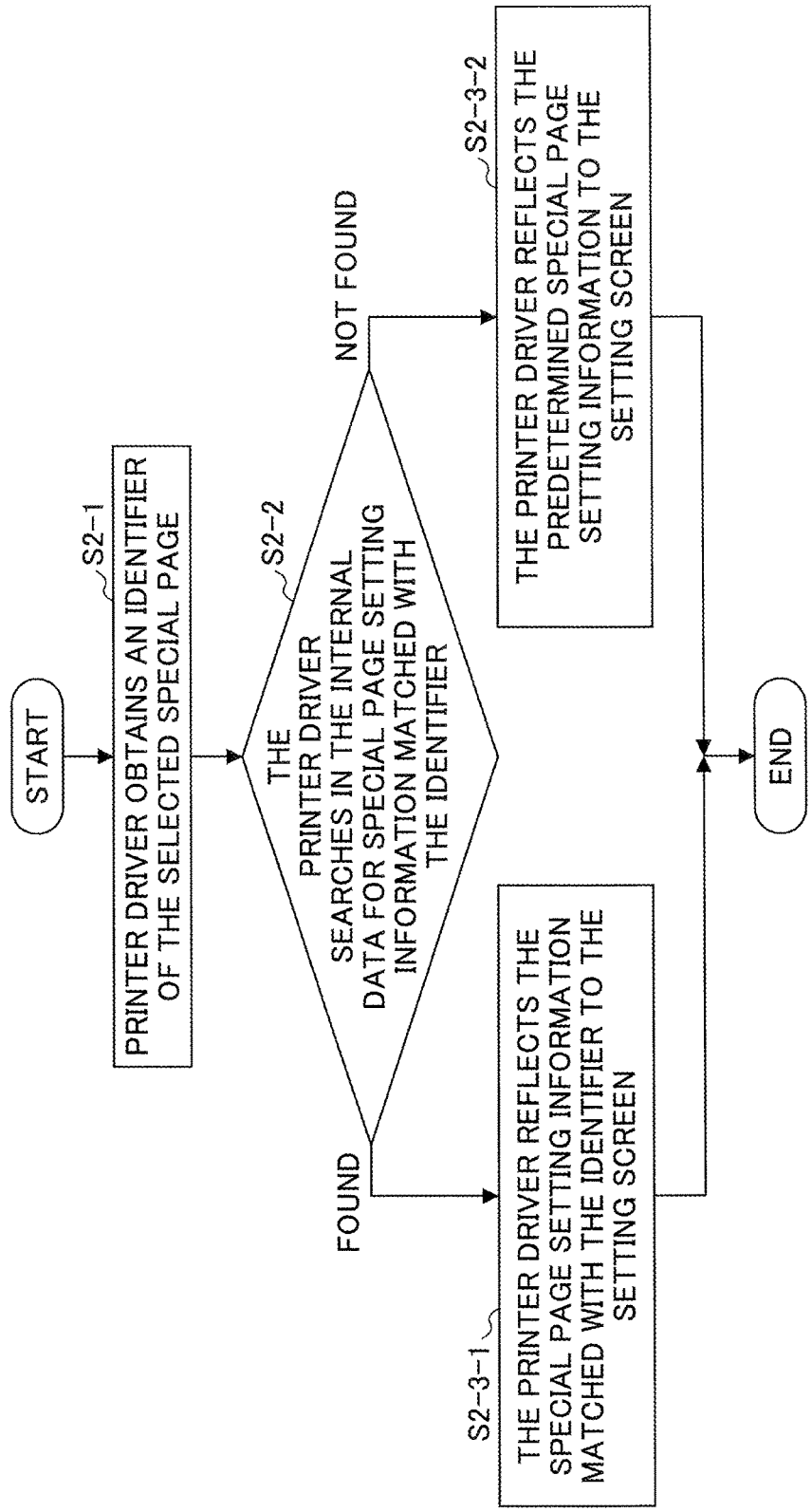
FIG. 18 is a flowchart illustrating a reflection process of exception page information in the printer driver.

Next, a reflection process of special page information will be described. FIG. 18 is a flowchart illustrating the reflection process of special page information in the printer driver 410. The printer driver 410 reflects the special page information to the setting screen in the following procedure.

In step S2-1, the printer driver 410 obtains an identifier (e.g., page number) of the selected "special page".

In step S2-2, the printer driver 410, using the identifier of the "special page" as a key, searches in the internal data for special page setting information matched with the identifier.

In step S2-3-1, in the case where the special page setting information matched with the identifier is found, the printer driver 410 reflects the special page setting information matched with the identifier on the setting screen.

In step S2-3-2, in the case where the special page setting information matched with the identifier is not found, the printer driver 410 reflects a predetermined setting information on the setting screen.

As a result, the GUI generation 430 generates a setting screen of the special page and displays the setting screen of the special page on the LCD 407.

Next, an update process of special page information will be described. FIG. 19 is a flowchart illustrating the update process of special page information in the printer driver 410. The printer driver 410 updates the special page information in the following procedure.

In step S3-1, the printer driver 410 receives a request (addition, update, or delete) from a user.

In step S3-2-1, in the case where the request is an addition, the printer driver 410 adds the special page setting information to the internal data.

In step S3-2-2, in the case where the request is an update, the printer driver 410, using the identifier of the "special page" as a key, searches in the internal data for special page setting information including the identifier of the "special page" currently being selected, and updates the internal data regarding the special page setting information of the "special page" extracted as a result of the search.

In step S3-2-3, in the case where the request is a delete, the printer driver 410, using the identifier of the "special page" as a key, searches in the internal data for special page setting information including the identifier of the "special page" currently being selected, and deletes from the internal data the special page setting information of the "special page" extracted as a result of the search.

As described above, in the printer driver and the print control apparatus, convenience for the user is enhanced and a plurality of the "special pages" can be edited together within a single screen, thereby making it easy to edit the "special pages".

Figure 21:
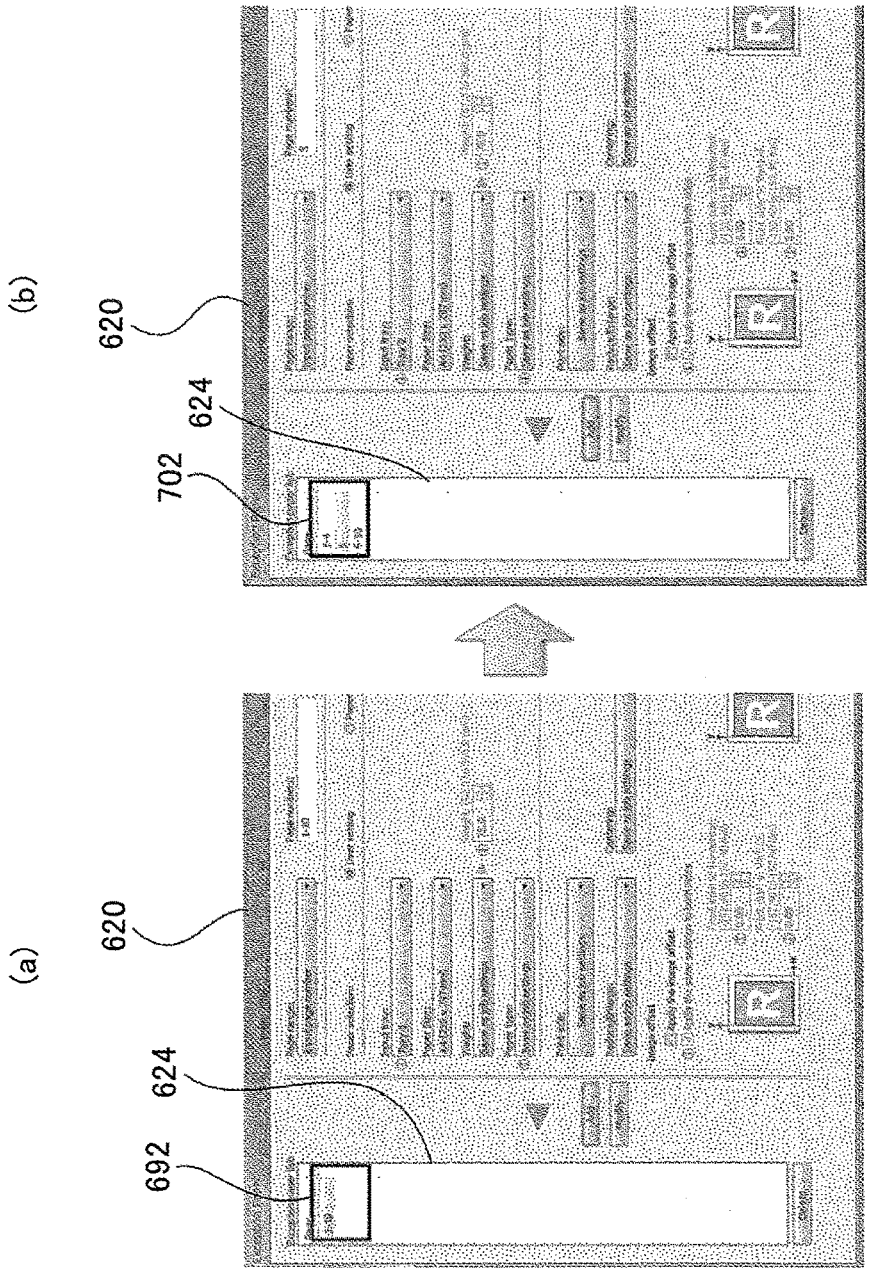
FIG. 21 is a drawing illustrating display images (a) and (b) before and after performing a special page division process in the printer driver.

Next, a "special page" division function in a special page setting edit process will be described. FIG. 21 is a drawing illustrating display images before and after performing a special page division process in the printer driver, and FIG. 22 is a drawing illustrating changes of internal states before and after performing the division process of special pages in the printer driver.

In the special page setting edit process, in the case where a "special page" with a different setting is added to a range of existing "special pages", a special page division process is performed. For example, a case where a special page [page 5, tray 2] with a different setting is added to existing special pages [pages 1-10, Tray 1] is described. In an image (a) of FIG. 21, in the list 624 of the exception page setting edit screen 620 in which the division process is performed, a display 692 of the pages 1-10 before the division process is shown. A new page 5 is added after the page 4 of the existing special pages. At this time, the division process is performed. After the division process is performed, in an image (b) of FIG. 21, in the list 624 of the exception page setting edit screen 620, a display 702 of three pieces of special page information after the division (first piece [pages 1-4, Tray 1], second piece [page 5, Tray 2], third piece [pages 6-10, Tray 1]) is shown.

Figure 23:
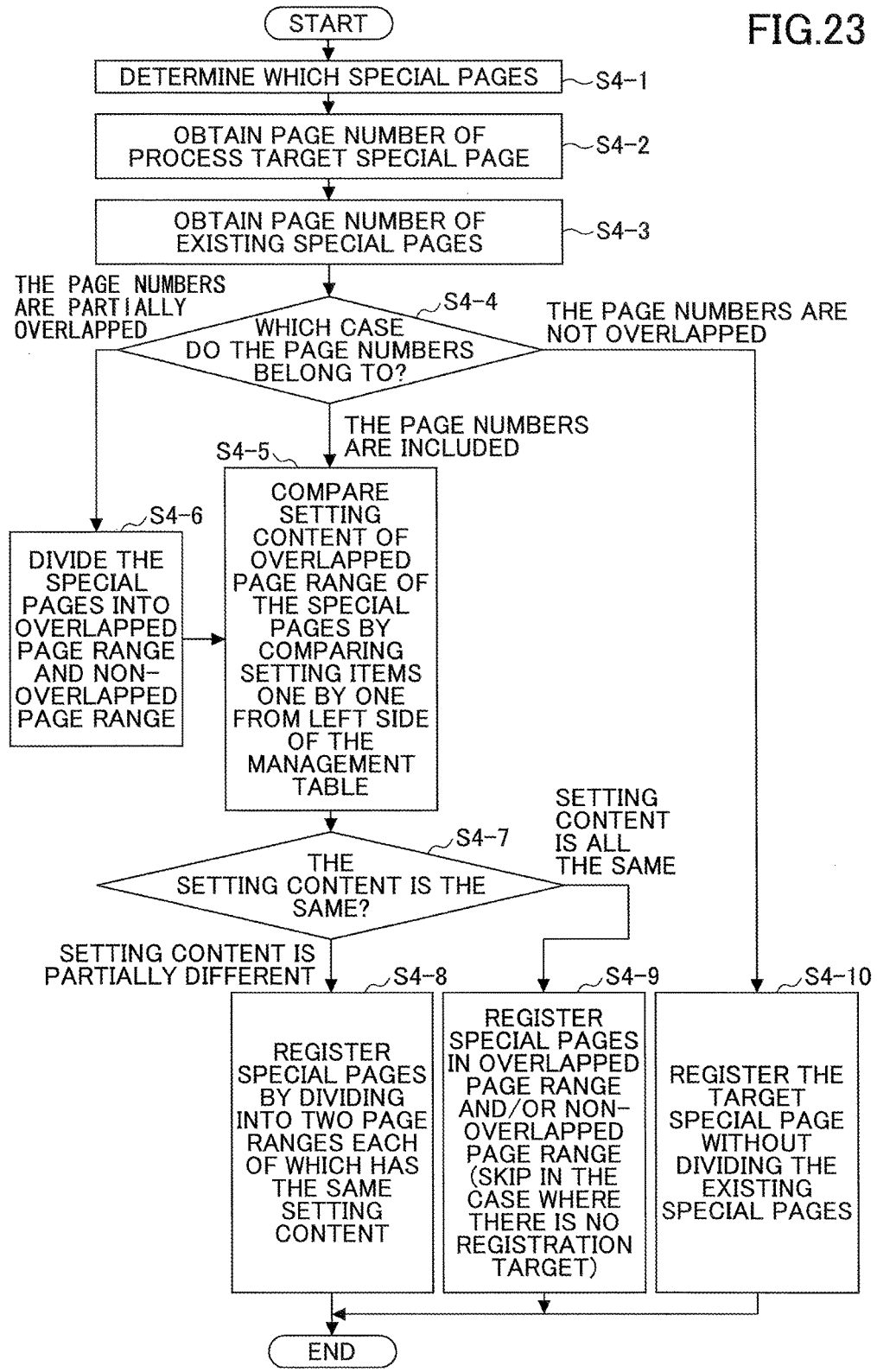
FIG. 23 is a flowchart illustrating a special page division process in the printer driver.

A flow of this "special page" division process will be described. FIG. 23 is a flowchart illustrating a special page division process in the printer driver 410. The printer driver 410 divides the special page information in the following procedure.

In step S4-1, the printer driver 410 determines which special pages should be modified.

In step S4-2, the printer driver 410 obtains page numbers of process target special pages.

In step S4-3, the printer driver 410 obtains page numbers of existing special pages.

In step S4-4, the printer driver 410 determines which case the page numbers belong to. By this determination, the printer driver 410 determines that the page numbers belong to any one of three cases: "target page numbers are included in the existing page numbers", "some page numbers are overlapped" and "no page numbers are overlapped".

In the case where it is determined that the page numbers belong to the case "target page numbers are included in the existing page numbers" in step S4-4, the printer driver performs the following process.

In step S4-5, the printer driver 410 compares the setting content of the special pages of overlapped page range by comparing the setting items in the management table, one by one from left to right.

By this comparison, the printer driver 410 determines whether "the setting content is the same?" in step S4-7. In the case where it is determined that "the setting content is partially different" in step S4-7, the printer driver 410 divides the existing special pages into two ranges of special pages so that the two ranges of special pages have the same setting content, and registers them.

In the case where it is determined that "all the setting content is the same" in step S4-7, the printer driver 410 registers the special pages in the overlapped page range and/or non-overlapped page range in step S4-9, and ends the whole process. At this time, in the case where there is no registration target, the printer driver 410 skips this process and ends the whole process.

In the case where it is determined that "some page numbers are overlapped" in step S4-4, the printer driver 410 divides the special pages into an overlapped page range and a non-overlapped page range in step S4-6, and moves to step S4-5.

In the case where it is determined that "no page numbers are overlapped", the printer driver 410 registers the target special pages without dividing the existing special pages in step S4-10, and ends the whole process.

This is the end of description of the special page division process.

Next, a "special page" uniting function will be described by taking an "exception page" uniting function as an example. In the special page setting edit process, in the case where "special pages" with the same setting as the existing "special pages" are added to the existing "special pages", the special page uniting process is performed.

FIG. 24 is a drawing illustrating display images before and after performing the exception page uniting process in the printer driver, and FIG. 25 is a drawing illustrating internal data before and after performing the exception page uniting process in the printer driver.

For example, when "exception pages" with the same setting as the existing "exception pages" [1-4, Tray 1] is added to the end of the existing "exception pages" [1-4, Tray 1], the "uniting process" is performed.

As shown in a display image (a) in FIG. 24, in the exception page setting edit screen 620 before the uniting, in the list 624, a display 732 including two pieces of page information [1-4] and [5-10] are shown. In this state, the internal data is shown as the exception table 820 illustrated in a display image (a) of FIG. 25. In the exception table 820, after "exception pages" [1-4, Tray 1, A4, . . . ], "exception pages" [5-10, Tray 1] with the same setting are stored. The added exception page information is indicated by a dotted line frame with a sign 751.

When the uniting process is performed, as shown in a display image (b) of FIG. 24, in the list 624 of the exception page setting edit screen 620, a display 742 of the special page information [1-10] after the uniting is shown. In this state, the internal data is shown as the exception table 820 illustrated in a display image (b) of FIG. 25. In the exception table 820, the united exception pages [1-10, Tray 1, A4, . . . ] are stored. The united exception page information is indicated by a dotted line frame with a sign 761.

It should be noted that the process priority of the uniting process is set lower than the above-mentioned division process so that the uniting process is performed after the division process.

Figure 26:
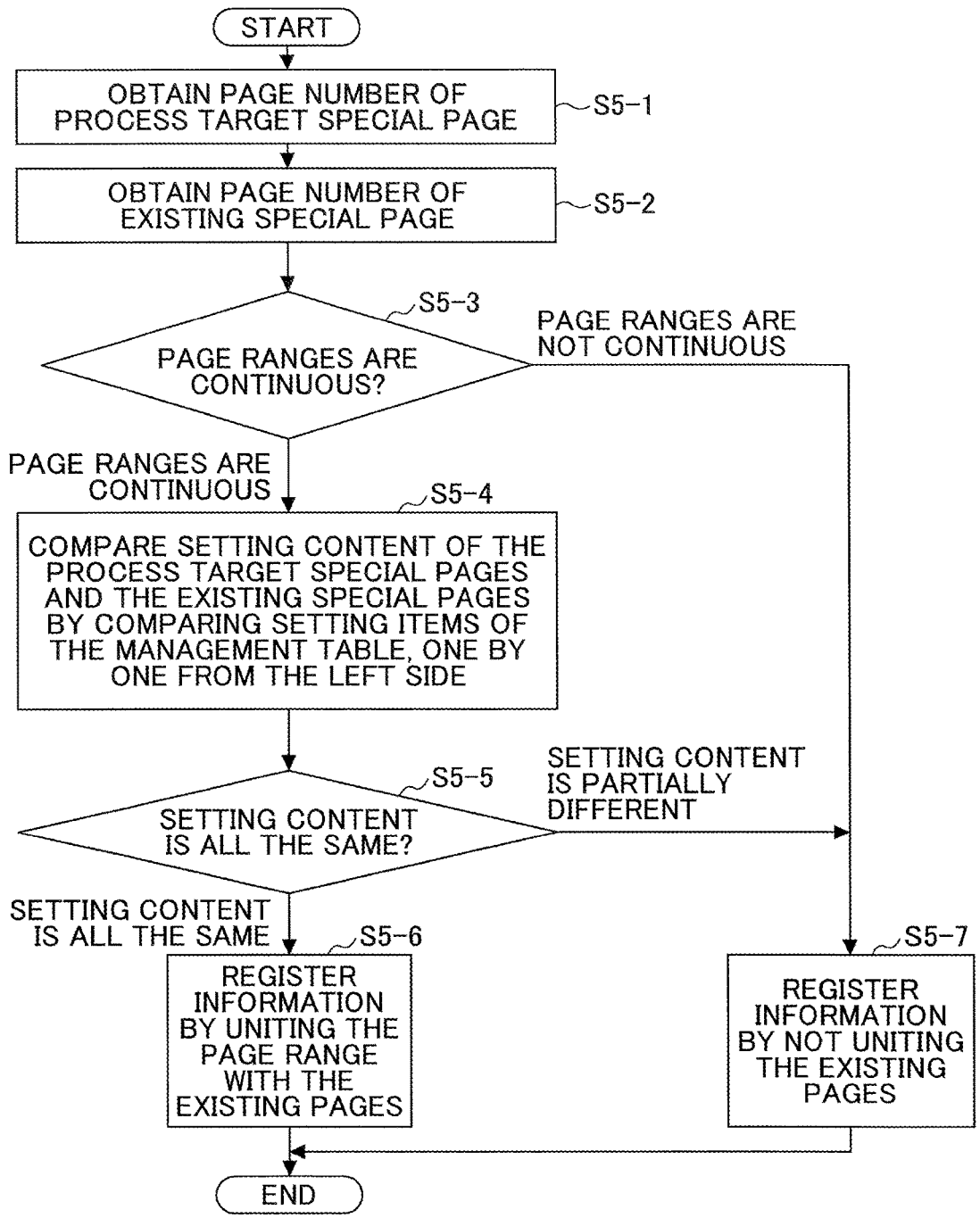
FIG. 26 is a flowchart illustrating a special page uniting process in the printer driver.

Next, the procedure of a special page uniting process will be described. FIG. 26 is a flowchart illustrating the special page uniting process in the printer driver 410.

In the uniting process, the printer driver 410 obtains page numbers of process target special pages in step S5-1.

In step S5-2, the printer driver 410 obtains page numbers of existing special pages.

Then, the printer driver 410, in step S5-3, determines "whether the page ranges of the page numbers of process target special pages and existing special pages are continuous or not?" By this determination, the flow of the operations of the printer driver 410 is divided into two cases: "the page ranges are continuous" and "the page ranges are not continuous".

In the case where it is determined that "the page ranges are continuous", in step S5-4, the printer driver 410 compares the setting content of the process target special pages and the existing special pages, by comparing all the setting items in the management table, for example, one by one from left to right.

Then, in step S5-5, the printer driver 410 determines whether "the setting content of the process target special pages and the existing special pages is the same for all setting items".

In the case where it is determined that "the setting content of the process target special pages and the existing special pages is the same for all setting items", the printer driver 410, in step S5-6, unites the page ranges of the process target special pages and the existing special pages, registers the united page range, and ends the process.

On the other hand, in the case where it is determined that "the page ranges are not continuous" in step S5-3 and in the case where it is determined that "the setting content of the process target special pages and the existing special pages is partially different", the printer driver 410, in step S5-7, registers the information of the process target special pages without uniting with the existing special pages and ends the process.

This is the end of the "special page" uniting process.

Next, an integration process of the special page setting information will be described. This process is performed, for example, before and after editing "special pages" and this process can display the integrated current state of setting states of current "insert pages", "exception pages" and "tab sheets" by displaying all the "special pages" in the list 611 of the special page list display screen 610.

Figure 27:
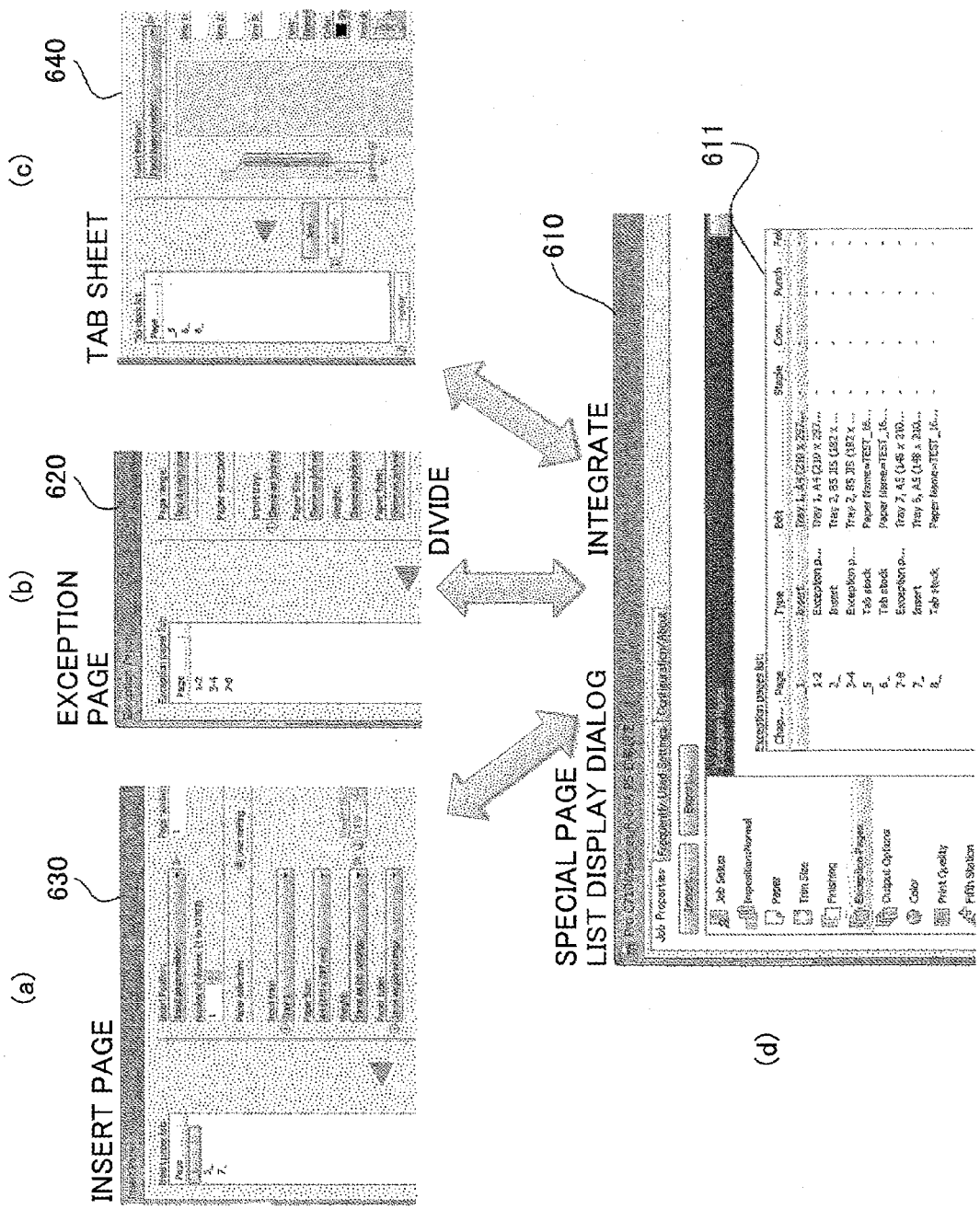
FIG. 27 is a drawing illustrating display images (a) through (d) before and after performing an integration process of special page setting information in the printer driver.
Figure 28:
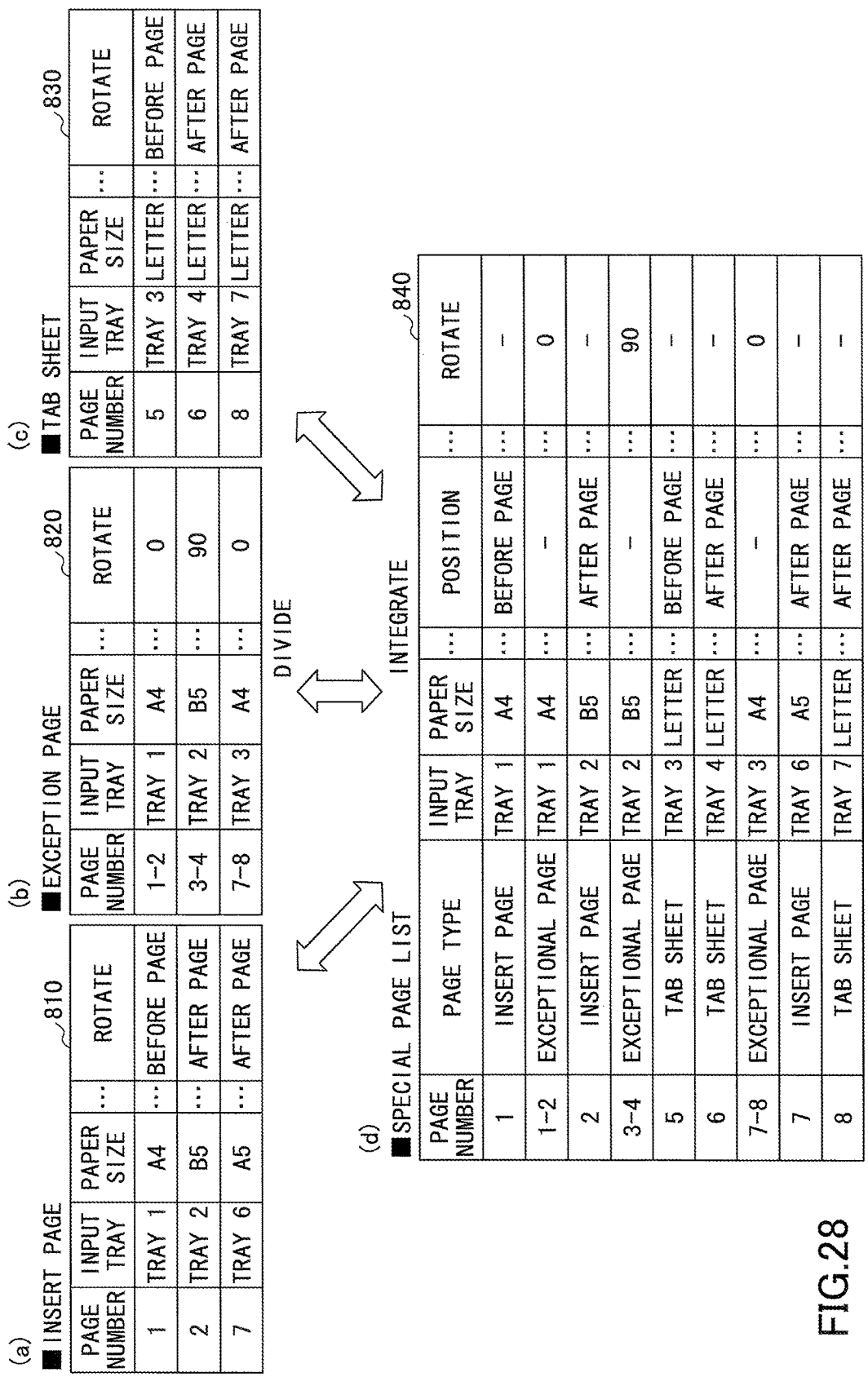
FIG. 28 is a drawing illustrating internal data (a) through (d) before and after performing an integration process of special page setting information in the printer driver.

FIG. 27 is a drawing illustrating display images before and after performing an integration process of special pages in the printer driver 410, and FIG. 28 is a drawing illustrating internal data before and after performing the integration process of special pages in the printer driver 410.

As shown in FIG. 27, in each of the special page setting edit screens, namely the exception page setting edit screen 620 (FIG. 8, an image (b) in FIG. 27); the insert page setting edit screen 630 (FIG. 9, an image (a) in FIG. 27); and the tab sheet setting edit screen 640 (FIG. 10, an image (c) in FIG. 27); setting information of each of the special pages is integrated at the timing of confirmation operation of registration.

Before the integration, the internal data for displaying the insert page setting edit screen 630 is stored as an insert page table 810 shown in an image (a) in FIG. 28. Also, the internal data for displaying the exception page setting edit screen 620 is stored as an exception page table 820 shown in an image (b) in FIG. 28. Furthermore, the internal data for displaying the tab sheet setting edit screen 640 is stored as a tab sheet table 830 shown in an image (c) in FIG. 28.

When the special page integration process is performed, in the list 611 of the special page list display screen 610, as shown in an image (d) in FIG. 27, all of the setting information of the edited special pages is displayed in the specified order, for example, in the page order. The internal data for displaying this list 611 of the special page list display screen 610 is stored as a special page list table 840 as shown in an image (d) in FIG. 28. This special page list table 840 is a table in which data of the insert page table 810, the exception page table 820 and the tab sheet table 830 is integrated and sorted by a rule with respect to page numbers, page types, insert positions, or the like, during the integration process.

Figure 29:
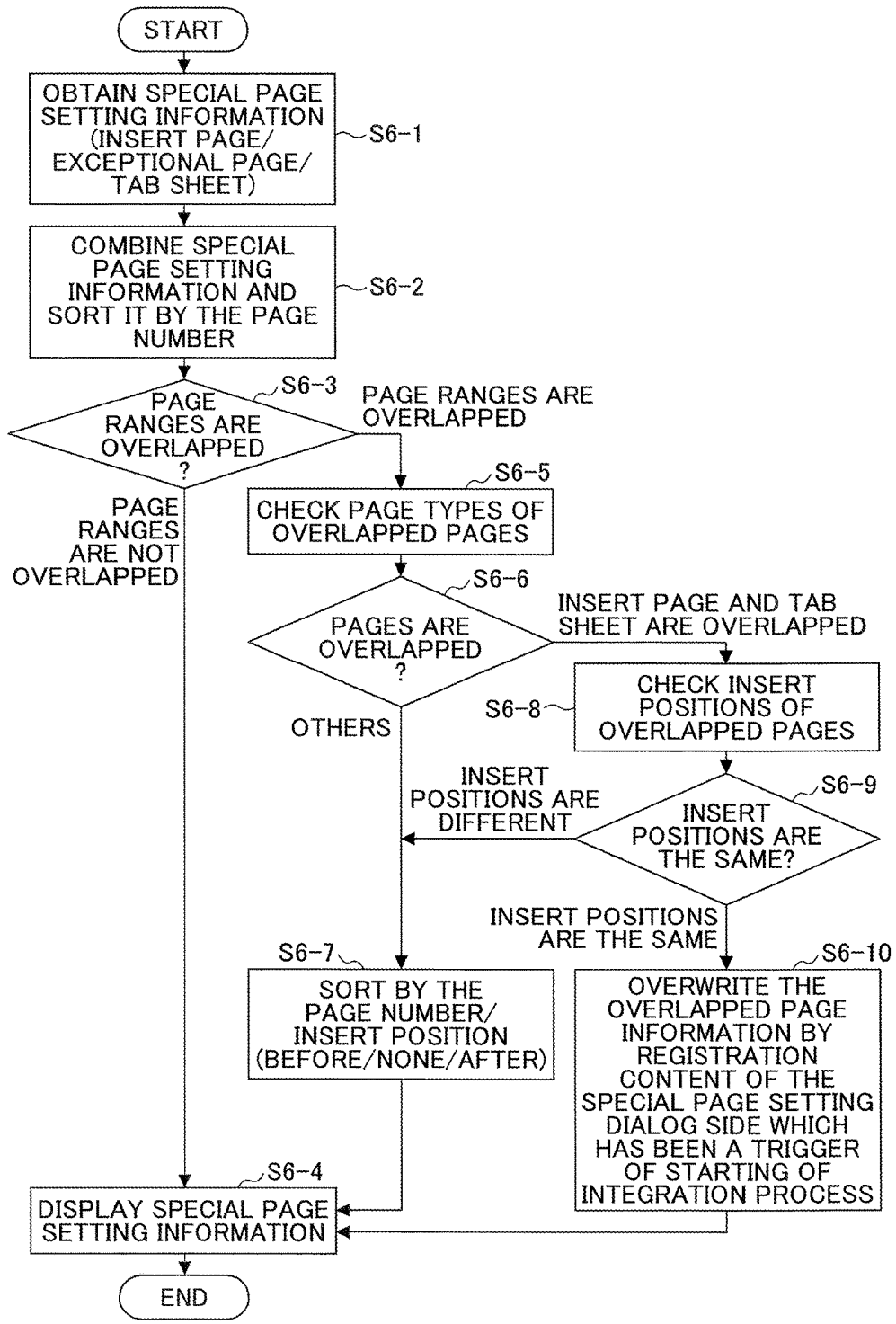
FIG. 29 is a flowchart illustrating an integration process of special page setting information in the printer driver.
Figure 30:
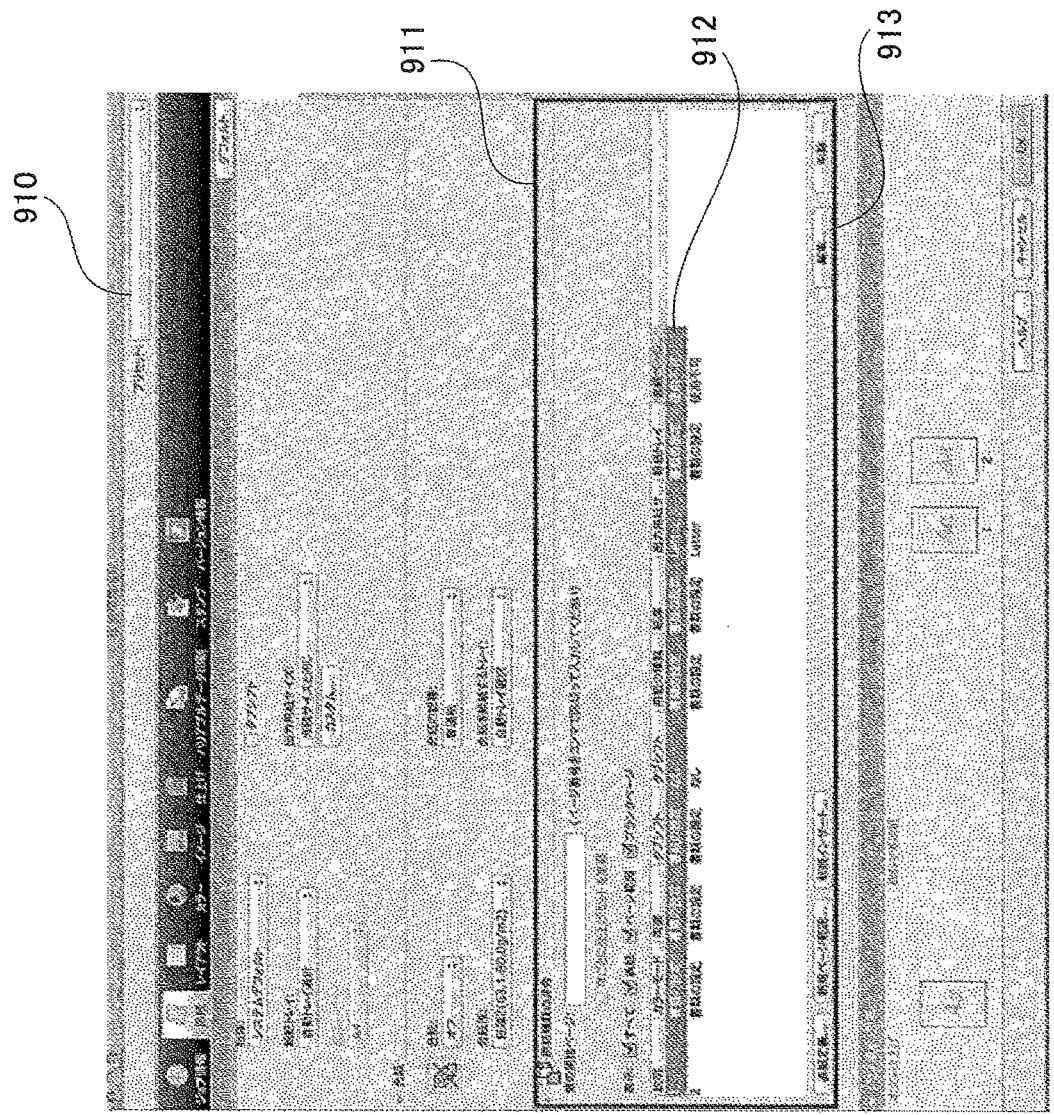
FIG. 30 is a drawing illustrating a special page setting edit screen in a conventional printer driver.
Figure 31:
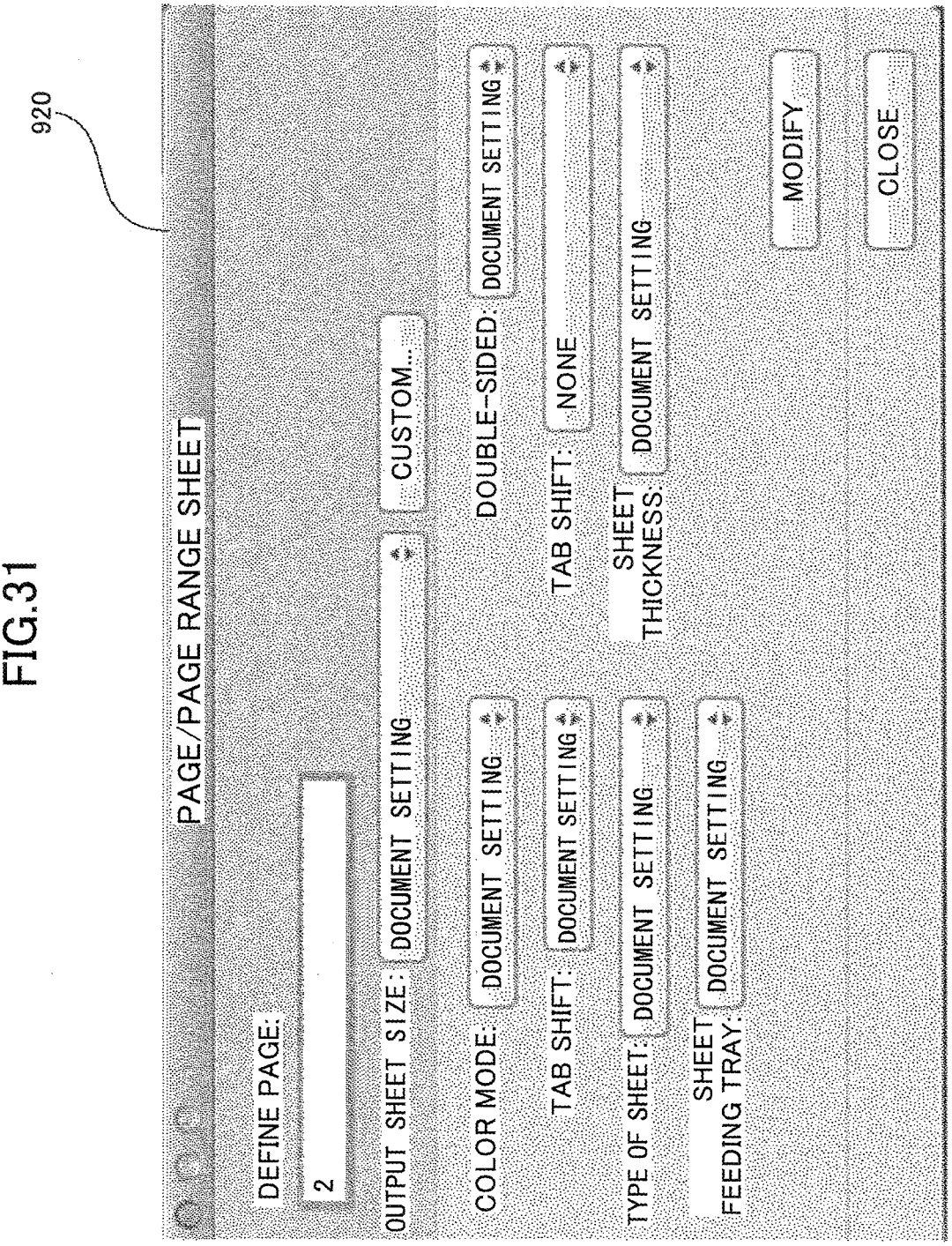
FIG. 31 is a drawing illustrating an exception page setting edit screen in a conventional printer driver.
Figure 32:
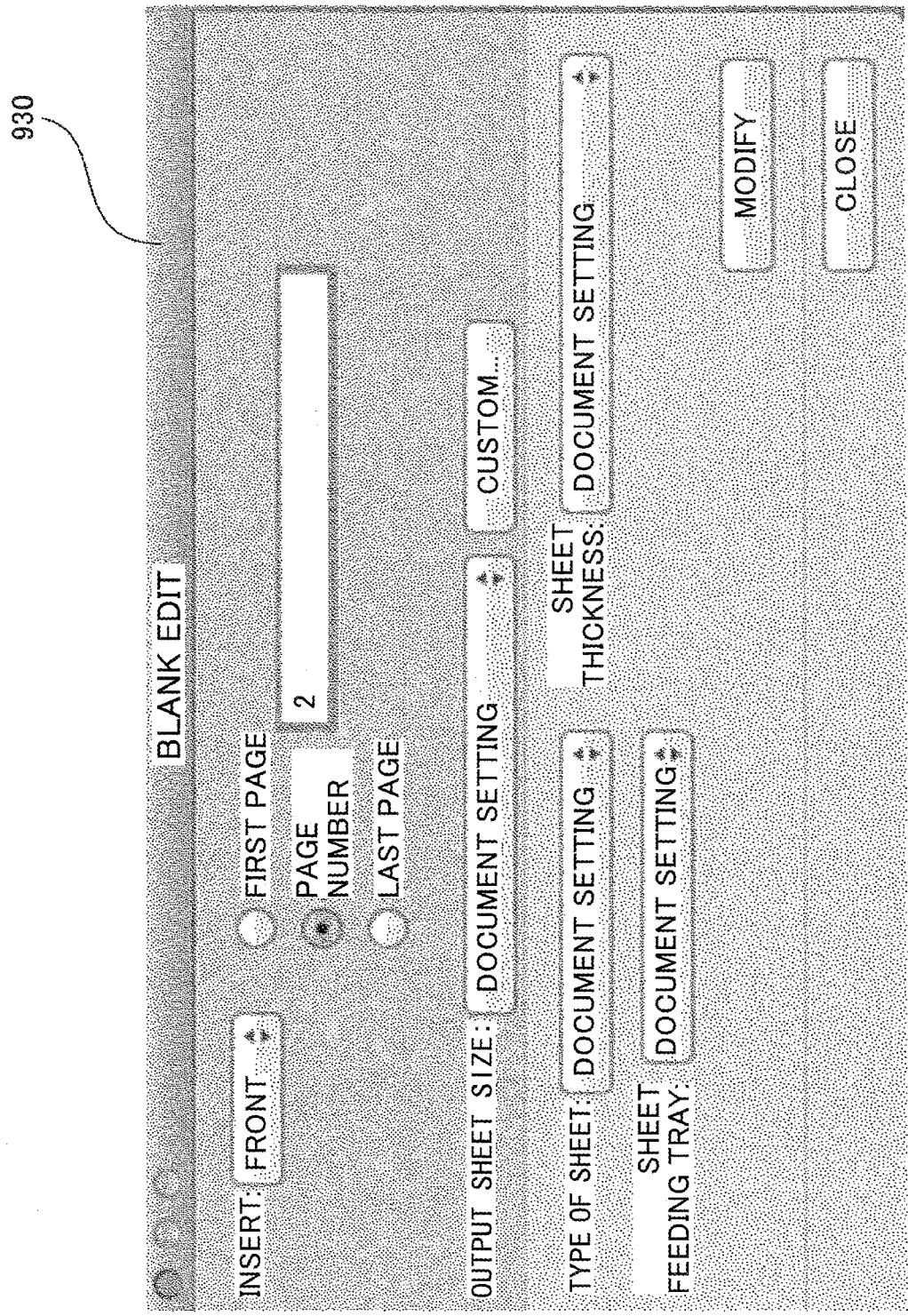
FIG. 32 is a drawing illustrating an insert page setting edit screen in a conventional printer driver.

In the following, a procedure of the integration process of special page setting information will be described. FIG. 29 is a flowchart illustrating the integration process of special page setting information in the printer driver.

In the integration process, in step S6-1, the printer driver 410 obtains special page setting information (insert pages/exception pages/tab sheets). The obtained special page setting information is, in each of the following steps, used for comparison with identified data.

In step S6-2, the printer driver 410 combines the special page setting information and sorts it by the page number.

Then, the printer driver 410, in step S6-3, determines "whether the page ranges are overlapped?" By this determination, the flow of the operations of the printer driver 410 is divided into "the page ranges are overlapped" case and "the page ranges are not overlapped" case.

In step S6-3, in the case where it is determined that "the page ranges are not overlapped", the printer driver 410, in step S6-4, displays the special page setting information and ends the process.

In step S6-3, in the case where it is determined that "the page ranges are overlapped", in step S6-5, the printer driver 410 checks page types of the overlapped pages.

Furthermore, the printer driver 410, in step S6-6, determines "whether the page ranges are overlapped?" By this determination, the flow of the operations of the printer driver 410 is divided into an "insert pages and tab sheets are overlapped" case and "other" cases.

In the case where it is determined as "other" cases, in step S6-7, the printer driver 410 sorts the special page setting information by the page number and the insert position (Before/None/After), moves to step S6-4, displays the special page setting information and ends the process.

In step S6-6, in the case where it is determined that "the insert pages and the tab sheets are overlapped", in step S6-8, the insert positions of the overlapped pages are checked. Furthermore, the printer driver 410, in step S6-9, determines "whether the insert positions are the same?" By this determination, the flow of the operations of the printer driver 410 is divided into "the insert positions are different" case and "the insert positions are the same" case.

In the case where it is determined that "the insert positions are different" in step S6-9, step S6-7 and step S6-4 are performed and the process ends.

In the case where it is determined that "the insert positions are the same" in step S6-9, the printer driver 410, in step S6-10, overwrites the overlapped page information by the registration content of a special page setting dialog side which has been a trigger of starting the integration process. Then, the printer driver 410 performs step S6-4 and ends the process.

This is the end of the integration process of the special page setting information.

Embodiment Examples and Benefits of the Present Invention

<First Aspect>

A print control method of an aspect of the present invention is a print control method in an information processing apparatus including a registration step of accepting via a setting screen a registration of a print setting for one or more specific pages of a print target consisting of one or more pages, a storage step of storing in a storage device the print setting accepted in the registration step with corresponding identification information identifying the specific pages, a first displaying step of displaying on the setting screen the identification information of the specific pages stored by the storage step, a selection step of accepting via the setting screen a selection of identification information displayed by the first displaying step, and a second displaying step of displaying on the setting screen the print setting corresponding to the identification information whose selection is accepted in the selection step.

According to this aspect, by applying a set of steps including the registration step, the storage step, the first display step, the selection step and the second display step, registration of the print setting of one or more specific pages of the print target consisting of one or more pages can be performed.

<Second Aspect>

The print control method of this aspect includes a modification step of accepting via the setting screen a modification of the print setting displayed in the second display step.

According to this aspect, the print setting displayed in the second display step can be easily modified in the modification step.

<Third Aspect>

The print control method of this aspect includes a delete step of accepting via the setting screen a delete of the print setting displayed in the second display step.

According to this aspect, the print setting displayed in the second display step can be easily deleted in the delete step.

<Fourth Aspect>

The print control method of this aspect includes a modification step of accepting via the setting screen a modification of the print setting displayed in the second display step, a delete step of accepting via the setting screen a deletion of the print setting displayed in the second display step, a list generation step of generating a list for all print settings, and an operation screen generation step of generating in a same screen an operation image of at least one of the registration step, the modification step, the delete step and the list generation step, and in the operation screen generation step, a print setting for at least one of the registration step, the modification step and the delete step is generated in the same screen.

According to this aspect, regarding a "special page" in which a desired print setting is set for each page, a plurality of the "special pages" can be edited together in a single screen, thereby convenience of users can be improved and users' burden can be reduced.

<Fifth Aspect>

In the print control method of this aspect, the print setting handled in at least one of the registration step, the modification step, the delete step and the list generation step is page insert information for newly inserting a page different from pages specified by a job into a position specified by the job.

According to this aspect, by generating the page insert information in the same screen, convenience of users can be improved and users' burden can be reduced.

<Sixth Aspect>

In the print control method of this aspect, the print setting handled in at least one of the registration step, the modification step, the delete step and the list generation step is for an exception page which indicates that setting information different from the setting information specified by a job is applied to a specified page.

According to this aspect, by generating the exception page in the same screen, convenience of users can be improved and users' burden can be reduced.

<Seventh Aspect>

In the print control method of this aspect, the print setting handled in at least one of the registration step, the modification step, the delete step and the list generation step is targeted for a tab sheet.

According to this aspect, by generating the page setting information for the tab sheet in the same screen, convenience of users can be improved and users' burden can be reduced.

<Eighth Aspect>

The print control method of this aspect includes a division step of, when a special page with a different setting is added to a set of special pages, dividing the set of special pages before and after the added special page.

According to this aspect, dividing pages can be easily performed, thereby convenience of users can be improved and users' burden can be reduced.

<Ninth Aspect>

The print control method of this aspect includes a uniting step of, when a special page with a same setting is added before or after an existing special pages, uniting all the special pages.

According to this aspect, uniting pages can be easily performed, thereby convenience of users can be improved and users' burden can be reduced.

<Tenth Aspect>

The print control method of this aspect includes a data integration step of generating a special page list data by integrating and sorting based on a given condition each of stored data lists of the print settings for different types of special pages.

According to this aspect, with an easy operation, list data for each type of special pages can be integrated and reordered, thereby a special page list data can be generated and displayed.

<Eleventh Aspect>

The print control method of this aspect includes a storage step of storing the print setting registered in the registration step as internal data, a search step of searching in the internal data for the print setting selected from the list generated in the list generation step, and a user interface generation step of generating a user interface for reflecting the print setting extracted as a result of the search step.

According to this aspect, by generating the user interface for reflecting the selected page setting information, the selected page setting information can be displayed, thereby convenience of users can be improved and users' burden can be reduced.

<Twelfth Aspect>

A printer driver program of this aspect causes a computer to execute the steps according to any one of the first through eleventh aspects.

According to this aspect, a printer driver program can be provided, with which printer driver program, regarding a "special page" in which a desired print setting is set for each page, a plurality of the "special pages" can be edited together in a single screen, thereby convenience of users can be improved and users' burden can be reduced.

<Thirteenth Aspect>

A print control apparatus of this aspect uses the print control method according to any one of the first through eleventh aspects and includes a registration unit configured to, by the registration step, newly register a desired print setting for each of the pages, an edit unit configured to, by the edit step, edit the print setting when needed, a delete unit configured to, by the delete step, delete the print setting when needed, a division unit configured to, by the division step, divide the print setting when needed, a uniting unit configured to, by the uniting step, unite the print setting when needed, a list generation unit configured to, by the list generation step, generate all the print settings as a list, and an operation screen generation unit configured to, by the operation screen generation step, generate in a same screen an operation image of at least one of the registration unit, the edit unit, the delete unit, the division unit, the uniting unit and the list generation unit.

According to this aspect, regarding a "special page" in which a desired print setting is set for each page, a plurality of the "special pages" can be edited together in a single screen, thereby convenience of users can be improved and users' burden can be reduced.

Further, the present invention is not limited to these embodiments, and various variations and modifications may be made without departing from the scope of the present invention.

The present application is based on and claims the benefit of priority of Japanese Priority Application No. 2014-020154 filed on Feb. 5, 2014 and Japanese Priority Application No. 2014-256075 filed on Dec. 18, 2014, the entire contents of which are hereby incorporated by reference.

What is claimed is:

1. A print control method in an information processing apparatus comprising:
   first displaying a setting screen for accepting print settings for specific pages of a print target;
   storing the print settings accepted with corresponding identification information identifying the specific pages;
   second displaying on the setting screen the identification information of the specific pages;
   selecting selected ones of the identification information displayed in the second displaying;
   third displaying on the setting screen, concurrent with the displaying of the selected ones of the identification information, a screen for accepting print settings corresponding to selected ones of the specific pages associated with the selected ones of the identification information such that the print settings of non-selected ones of the specific pages associated with non-selected ones of the identification information are not displayed;
   receiving modified print settings for the selected ones of the specific pages; and
   dividing the specific pages into unmodified specific pages and modified specific pages, if the selected ones of the specific pages are intermediate ones of the specific pages and the modified print settings corresponding to the selected ones of the specific pages are different from the print settings of the non-selected ones of the specific pages, the dividing including,
      setting the selected ones of the selected pages as the modified specific pages and the non-selected ones of the specific pages as the unmodified specific pages,
      separating the identification information of the specific pages such that the identification information associated with the unmodified specific pages do not include identification information associated with the modified specific pages, the separating including separating the identification information associated with the unmodified specific pages having pages from a first page of the identification information associated with the specific pages to a page before the modified specific pages, and separating the identification information associated with unmodified pages having pages from a page after the modified specific pages to a last page of identification information associated with the specific pages,
      storing the modified print settings such that the modified print settings are associated with the identification information of the modified specific pages, and
      fourth displaying on the setting screen, the identification information associated with the unmodified specific pages and the identification information associated with the modified specific pages.

2. The print control method according to claim 1, further comprising:
   accepting via the setting screen the modified print settings of the selected ones of the specific pages.

3. The print control method according to claim 1, further comprising:
   accepting via the setting screen a delete of the print settings of the selected ones of the specific pages.

4. The print control method according to claim 1, further comprising:
   accepting via the setting screen the modified print settings of the selected ones of the specific pages to perform a modification by entering the modified print settings;
   accepting via the setting screen a deletion of the print settings of the selected ones of the specific pages;
   generating a list of the print settings; and
   generating an operation image of at least one of the first displaying, the modification, the deletion and the list of the print settings in an operation screen, wherein
      the print settings for at least one of the first displaying, the modification, the deletion and the list of the print settings is generated in a same screen.

5. The print control method according to claim 4, wherein the print setting handled by at least one of the first displaying, the modification, the deletion and the list of the print settings is page insert information for newly inserting a page different from pages specified by a job into a position specified by the job.

6. The print control method according to claim 4, wherein the print setting handled by at least one of the first displaying, the modification, the deletion and the list generation of the print settings is an exception page which indicates that a setting information different from the setting information specified by a job is applied to a specified page.

7. The print control method according to claim 4, wherein the print setting handled by at least one of the first displaying, the modification, the deletion and the list generation of the print settings is targeted for a tab sheet.

8. The print control method according to claim 4, further comprising:
- determining whether the selected ones of the specific pages immediately precede or follow the non-selected ones of the specific pages, and whether the print settings associated with the non-selected ones of the specific pages and the selected ones of the specific pages are same;
- creating identification information indicating pages including the selected ones of the specific pages and the non-selected ones of the specific pages, if the determining determines that the selected ones of the specific pages immediately follow the non-selected ones of the specific pages, and the print settings associated with the non-selected ones of the specific pages and the selected ones of the specific pages are same;
- associating the same print setting having the created identification information; and
- storing the same print settings.

9. The print control method according to claim 4, further comprising:
- generating a specific page list data by integrating and sorting based on a given condition stored data lists of the print settings for different types of the specific pages.

10. The print control method according to claim 4 further comprising:
- storing the print settings displayed in the first displaying as internal data;
- searching in the internal data for the print settings selected from the list; and
- reflecting the print settings extracted after searching in the internal data on the setting screen.

11. A non-transitory computer-readable recording medium having a program stored therein that, when executed by a processor, configures the processor to display print settings on the display device by,
- first displaying a setting screen for accepting print settings for specific pages of a print target,
- storing the print settings accepted with corresponding identification information identifying the specific pages,
- second displaying on the setting screen the identification information of the specific pages,
- selecting selected ones of the identification information displayed in the second displaying,
- third displaying on the setting screen, concurrent with the displaying of the selected ones of the identification information, a screen for accepting print settings corresponding to selected ones of the specific pages associated with the selected ones of the identification information such that the print settings of non-selected ones of the specific pages associated with non-selected ones of the identification information are not displayed,
- receiving modified print settings for the selected ones of the specific pages, and
- dividing the specific pages into unmodified specific pages and modified specific pages, if the selected ones of the specific pages are intermediate ones of the specific pages and the modified print settings corresponding to the selected ones of the specific pages are different from the print settings of the non-selected ones of the specific pages, the dividing including,
  - setting the selected ones of the selected pages as the modified specific pages and the non-selected ones of the specific pages as the unmodified specific pages,
  - separating the identification information of the specific pages such that the identification information associated with the unmodified specific pages do not include identification information associated with the modified specific pages, the separating including separating the identification information associated with the unmodified specific pages having pages from a first page of the identification information associated with the specific pages to a page before the modified specific pages, and separating the identification information associated with unmodified pages having pages from a page after the modified specific pages to a last page of identification information associated with the specific pages,
  - storing the modified print settings such that the modified print settings are associated with the identification information of the modified specific pages, and
  - fourth displaying on the setting screen, the identification information associated with the unmodified specific pages and the identification information associated with the modified specific pages.

12. A print control apparatus, comprising:
a display device; and
a processor configured to display print settings on the display device by,
- first displaying a setting screen for accepting print settings for specific pages of a print target,
- storing the print settings accepted with corresponding identification information identifying the specific pages,
- second displaying on the setting screen the identification information of the specific pages,
- selecting selected ones of the identification information displayed in the second displaying,
- third displaying on the setting screen, concurrent with the displaying of the selected ones of the identification information, a screen for accepting the print settings corresponding to selected ones of the specific pages associated with the selected ones of the identification information such that the print settings of non-selected ones of the specific pages associated with non-selected ones of the identification information are not displayed,
- receiving modified print settings for the selected ones of the specific pages, and
- dividing the specific pages into unmodified specific pages and modified specific pages, if the selected ones of the specific pages are intermediate ones of the specific pages and the modified print settings corresponding to the selected ones of the specific pages are different from the print settings of the non-selected ones of the specific pages, the dividing including,
  - setting the selected ones of the selected pages as the modified specific pages and the non-selected ones of the specific pages as the unmodified specific pages,
  - separating the identification information of the specific pages such that the identification information associated with the unmodified specific pages do not include identification information associated with the modified specific pages, the separating including separating the identification information associated with the unmodified specific pages having pages from a first page of the identification information associated with the specific pages to a page before the modified specific pages, and separating the identification information associated with unmodified pages having pages from a page after the modified specific pages to a last page of the identification information associated with the specific pages, storing the modified print settings such that the modified print settings are associated with the identification information of the modified specific pages, and fourth displaying on the setting screen, the identification information associated with the unmodified specific pages and the identification information associated with the modified specific pages.

13. The print control apparatus according to claim 12, wherein the processor is further configured to,
accept via the setting screen the modified print settings of the selected ones of the specific pages.

14. The print control apparatus according to claim 12, wherein the processor is further configured to,
accept via the setting screen a delete of the print settings of the selected ones of the specific pages.

15. The print control apparatus according to claim 12, wherein the processor is further configured to,
accept via the setting screen the modified print settings of the selected ones of the specific pages to perform a modification by entering the modified print settings,
accept via the setting screen a deletion of the print settings of the selected ones of the specific pages,
generate a list of the print settings, and
generate an operation image of at least one of the first displaying, the modification, the deletion and the list of the print settings in an operation screen, wherein
the print settings for at least one of the first displaying, the modification, the deletion, and the list of the print settings is generated in a same screen.

16. The print control apparatus according to claim 15, wherein the print setting is page insert information for newly inserting a page different from pages specified by a job into a position specified by the job.

17. The print control apparatus according to claim 15, wherein the print setting is an exception page which indicates that a setting information different from the setting information specified by a job is applied to a specified page.

18. The print control apparatus according to claim 15, wherein the print setting is targeted for a tab sheet.

19. The print control apparatus according to claim 15, wherein the processor is further configured to,
generate a specific page list data by integrating and sorting based on a given condition stored data lists of the print settings for different types of the specific pages.

20. The print control apparatus according to claim 15, wherein the processor is further configured to,
store the print settings displayed in the first displaying as internal data,
search in the internal data for the print settings selected from the list, and
reflect the print settings extracted after searching in the internal data on the setting screen.

* * * * *